(12) United States Patent
Yasukawa et al.

(10) Patent No.: US 11,425,734 B2
(45) Date of Patent: Aug. 23, 2022

(54) USER EQUIPMENT AND REFERENCE SIGNAL TRANSMISSION METHOD

(71) Applicant: NTT DOCOMO, INC., Tokyo (JP)

(72) Inventors: Shinpei Yasukawa, Tokyo (JP); Satoshi Nagata, Tokyo (JP); Shaozhen Guo, Beijing (CN); Xin Wang, Beijing (CN); Chongning Na, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 23 days.

(21) Appl. No.: 16/636,576

(22) PCT Filed: Aug. 10, 2017

(86) PCT No.: PCT/JP2017/029227
§ 371 (c)(1),
(2) Date: Feb. 4, 2020

(87) PCT Pub. No.: WO2019/030932
PCT Pub. Date: Feb. 14, 2019

(65) Prior Publication Data
US 2021/0160891 A1    May 27, 2021

(51) Int. Cl.
*H04W 72/10* (2009.01)
*H04L 5/00* (2006.01)
*H04W 24/10* (2009.01)

(52) U.S. Cl.
CPC ........... *H04W 72/10* (2013.01); *H04L 5/0048* (2013.01); *H04W 24/10* (2013.01)

(58) Field of Classification Search
CPC .............................. H04W 72/10; H04W 48/12
See application file for complete search history.

(56) References Cited

U.S. PATENT DOCUMENTS 10,003,952 B2 * 6/2018 Sorrentino ............ H04W 8/005
11,271,699 B1 * 3/2022 Eyuboglu ............... H04L 41/16
(Continued)

FOREIGN PATENT DOCUMENTS

| CN | 104023382 A | 9/2014 |
| CN | 104247320 A | 12/2014 |

(Continued)

OTHER PUBLICATIONS

International Search Report issued in PCT/JP2017/029227 dated Sep. 19, 2017 (4 pages).

(Continued)

*Primary Examiner* — Deepa Belur
(74) *Attorney, Agent, or Firm* — Osha Bergman Watanabe & Burton LLP

(57) ABSTRACT

A user equipment in a wireless communication system includes a configuration information management unit configured to retain configuration information for transmitting a reference signal used for measuring interference in other user equipments, and a signal transmitter configured to transmit the reference signal based on the configuration information. When transmission of the reference signal contends with transmission or reception of another signal, the signal transmitter determines whether the reference signal is to be transmitted or not based on a predetermined priority level.

3 Claims, 19 Drawing Sheets

(56) References Cited

U.S. PATENT DOCUMENTS

| | | | |
|---|---|---|---|
| 2013/0286904 A1 | 10/2013 | Xu et al. | |
| 2014/0328299 A1 | 11/2014 | Kalhan | |
| 2015/0173089 A1* | 6/2015 | Baghel | H04W 48/12 370/329 |
| 2015/0208262 A1* | 7/2015 | Siomina | H04W 24/10 370/252 |
| 2015/0350928 A1* | 12/2015 | Zhang | H04W 52/244 370/252 |
| 2016/0205717 A1* | 7/2016 | Kazmi | H04W 76/15 455/435.2 |
| 2016/0255670 A1* | 9/2016 | Lee | H04W 76/14 370/329 |
| 2019/0357224 A1* | 11/2019 | Li | H04W 72/04 |
| 2020/0229009 A1* | 7/2020 | Xu | H04L 5/0091 |
| 2021/0111823 A1 | 4/2021 | Choi et al. | |
| 2021/0112503 A1* | 4/2021 | Zhang | H04B 17/345 |

FOREIGN PATENT DOCUMENTS

| | | | | |
|---|---|---|---|---|
| JP | 2015-504631 A | 2/2015 | | |
| JP | 2020511866 A | 4/2020 | | |
| WO | WO-2014107850 A1 * | 7/2014 | | H04W 24/02 |
| WO | WO-2015082999 A2 * | 6/2015 | | H04W 72/1215 |
| WO | WO-2018126792 A1 * | 7/2018 | | H04W 24/08 |
| WO | WO-2018126932 A1 * | 7/2018 | | H04B 17/345 |

OTHER PUBLICATIONS

Written Opinion of the International Searching Authority issued in PCT/JP2017/029227 dated Sep. 19, 2017 (3 pages).

3GPP TS 36.331 V14.3.0; "3rd Generation Partnership Project; Technical Specification Group Radio Access Network; Evolved Universal Terrestrial Radio Access (E-UTRA); Radio Resource Control (RRC); Protocol specification (Release 14)"; Jun. 2017 (745 pages).

Extended European Search Report issued in counterpart European Patent Application No. 17921288.1, dated Feb. 22, 2021 (11 pages).

Kyocera; "Sidelink gap request and configuration"; 3GPP TSG-RAN WG2 #92, R2-156652; Anaheim, USA, Nov. 16-20, 2015 (6 pages).

Office Action in counterpart Japanese Patent Application No. 2019-535571 dated Jul. 20, 2021 (5 pages).

Office Action in counterpart Chinese Patent Application No. 201780093668.7 dated Sep. 2, 2021 (21 pages).

3GPP TSG RAN WG1 Meeting NR Ad-Hoc#2; R1-1710128 "UE-to-UE measurement as an enabler for CLI mitigation schemes" ZTE; Qingdao, P R. China; Jun. 27-30, 2017 (9 pages).

Office Action issued in Japanese Application No. 2019-535571; dated Feb. 22, 2022 (6 pages).

Office Action issued in European Application No. 17921288.1; dated Mar. 30, 2022 (5 pages).

* cited by examiner

Example of Static TDD

Common DL/UL pattern is used in all cells
(DL/UL is predetermined)

Example of Dynamic TDD

Individual DL/UL pattern is used in each cell
(DL/UL can be switched in accordance with required traffic)

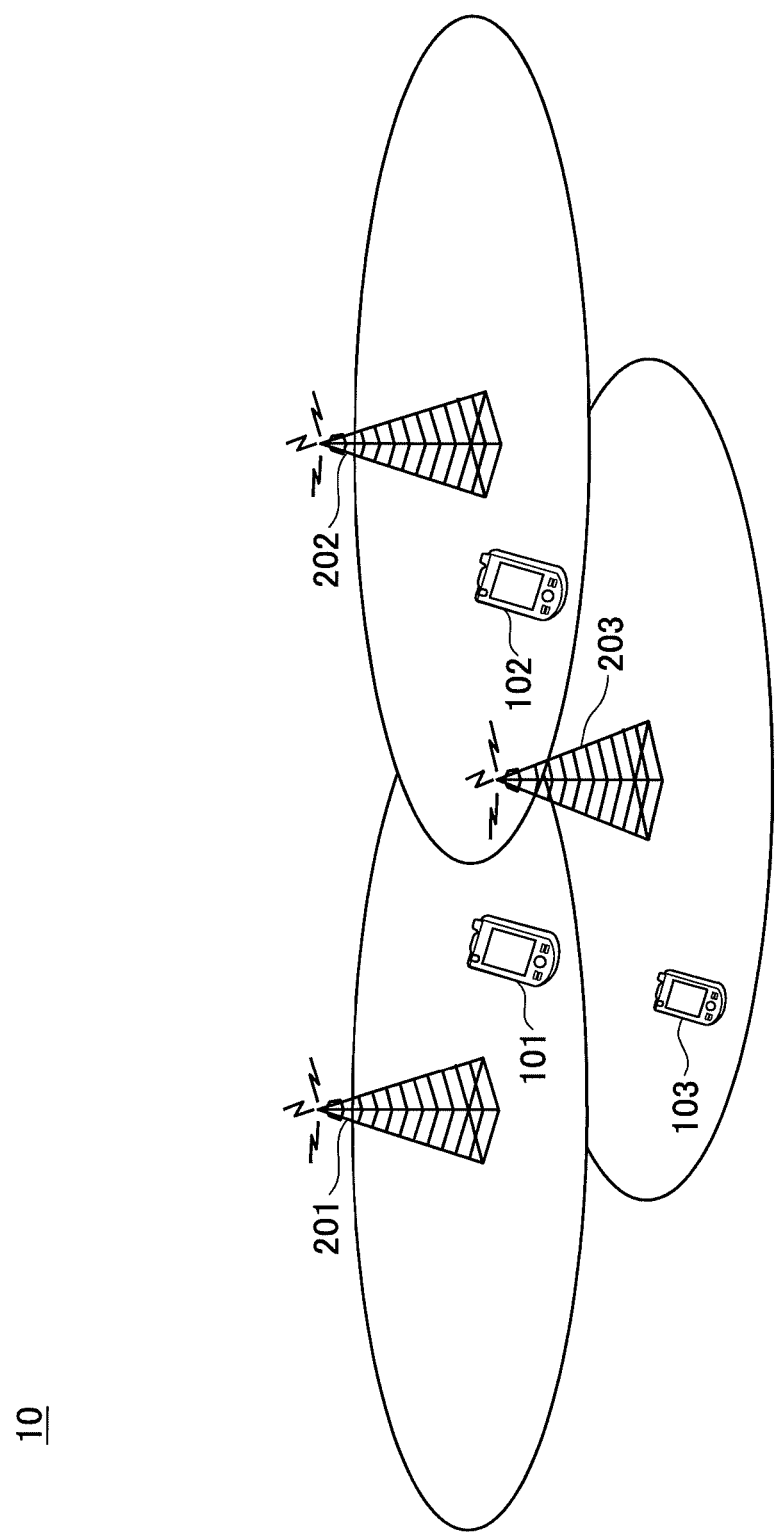

USER EQUIPMENT AND REFERENCE SIGNAL TRANSMISSION METHOD

TECHNICAL FIELD

This invention relates to a user equipment in a wireless communication system.

BACKGROUND ART

In 3GPP (3rd Generation Partnership Project), a next-generation communication standard (NR (also referred to as 5G) after LTE (Long Term Evolution) or LTE-Advanced is being discussed. In NR, a flexible duplex system is under investigation for flexibly controlling resources used for a downlink (hereinafter referred to as "DL") communication and an uplink (hereinafter referred to as "UL") communication, depending on occurrence of DL traffic and UL traffic. An example of the flexible duplex system includes a TDD (Time Division Duplex) system in which a UL resource and a DL resource are switched dynamically in a time domain (hereinafter, this TDD system will be referred to as "dynamic TDD").

Typically in a small cell, a difference between DL traffic and UL traffic tends to be larger as compared to a large cell. Accordingly, for each cell, by using dynamic TDD independently to control a DL communication and a UL communication, traffic can be accommodated efficiently.

In the dynamic TDD, for every given time interval such as a subframe, a slot, or a mini-slot, a DL/UL transmission direction is dynamically changed. That is, as illustrated in FIG. 1A, in static TDD applied to LTE, a preconfigured DL/UL configuration that is common to each cell is used. Conversely, in the dynamic TDD, as illustrated in FIG. 1B, an individual DL/UL configuration is used in each cell. In the dynamic TDD, as illustrated in FIG. 1B, a DL/UL configuration is changed semi-statically or flexibly.

When adopting a method in which an individual DL/UL configuration is used in each cell as described above, with a DL communication in a certain cell (will be referred to as a "victim cell"), an UL communication in another cell (will be referred to as an "aggressor cell") interferes. As a result, a case may happen in which a user equipment in the victim cell cannot receive a signal from a base station appropriately.

PRIOR-ART DOCUMENT

Non-Patent Document

[Non-Patent Document 1] 3GPP TS 36.331 V14.3.0 (2017 June)

SUMMARY OF INVENTION

Problem to be Solved by the Invention

One idea to solve the above problem is that, by sending and receiving DL/UL configurations among base stations, each base station determines a DL/UL configuration of one's own cell so as to be less affected by other cells or to less affect other cells. One of the methods to enable the idea is that a user equipment in a certain cell transmits a reference signal, another user equipment in another cell measures received power of the reference signal (such as RSRP), and the another user equipment reports the measured received power to a base station. This measurement is referred to as UE-to-UE measurement (measurement between user equipments).

However, in addition to sending and receiving the reference signal for the above measurement, the user equipment needs to perform other signal communication, such as UL signal transmission, DL signal reception, and D2D (sidelink) signal transmission/reception. Therefore, because the user equipment may have to perform transmission/reception of a reference signal and transmission/reception of other signals simultaneously, the user equipment may not be able to transmit or receive any one of the signals. Conventional technology such as LTE does not provide a countermeasure to resolve the problem.

This invention is made to solve the above problem, and aims at providing a technique used in UE-to-UE measurement to enable a user equipment to appropriately transmit or receive a reference signal for measurement of interference.

Means for Solving the Problem

According to the present disclosure, a user equipment in a wireless communication system is provided. The user equipment includes a configuration information management unit configured to retain configuration information for transmitting a reference signal used for measuring interference in other user equipments, and a signal transmitter configured to transmit the reference signal based on the configuration information. When transmission of the reference signal contends with transmission or reception of another signal, the signal transmitter determines whether the reference signal is to be transmitted or not based on a predetermined priority level.

Advantage of the Invention

According to the present disclosure, a technique can be provided used in UE-to-UE measurement to enable a user equipment to appropriately transmit or receive a reference signal for measurement of interference.

BRIEF DESCRIPTION OF DRAWINGS

FIG. 2 is a diagram illustrating a wireless communication system according to an embodiment of the present invention;

DETAILED DESCRIPTION OF THE PREFERRED EMBODIMENTS

Figure 1A:
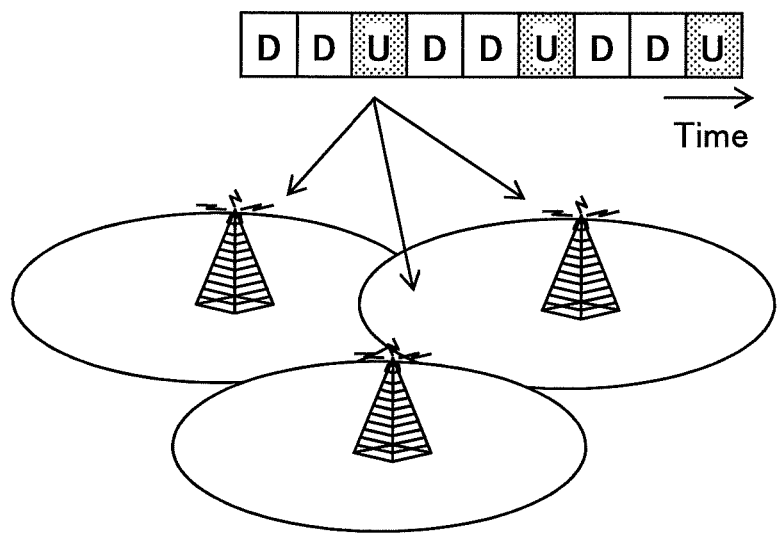
FIG. 1A is a diagram for describing static TDD.
Figure 1B:
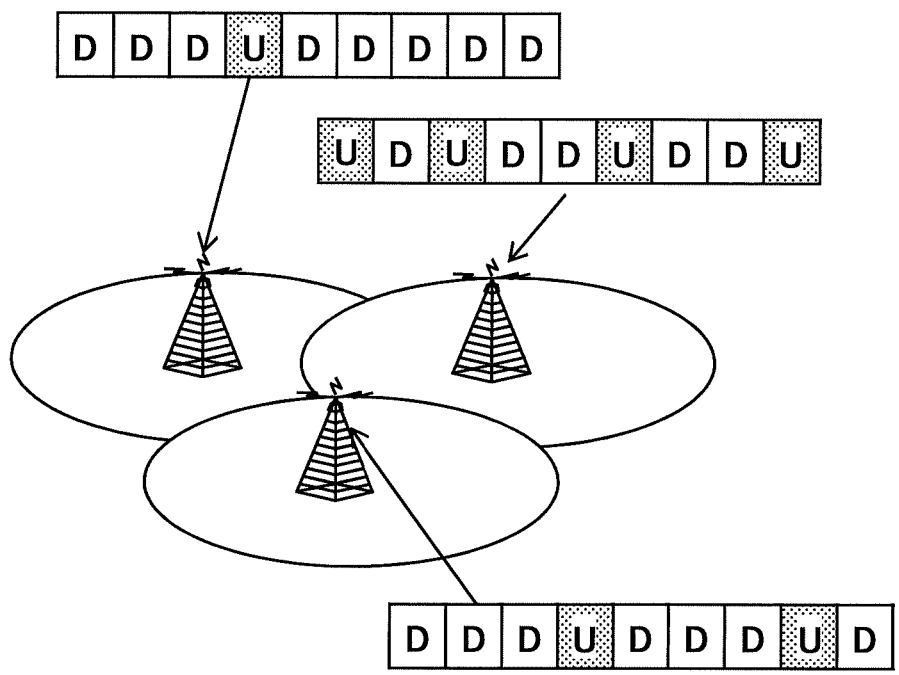
FIG. 1B is a diagram for describing dynamic TDD.

An embodiment of the present invention (present embodiment) will be described below with reference to the drawings. Note that the embodiment that will be described below is simply an example, and embodiments to which the present invention is applied are not limited to the following embodiment.

The present embodiment will be described based on a premise that a wireless communication system according to the present embodiment supports at least LTE communication standard. Therefore, when operating the wireless communication system, conventional technologies regulated by existing LTE can be properly used. However, the conventional technology to be used is not limited to existing LTE. In addition, a term "LTE" used in the present specification includes LTE-Advanced, and communication standards after LTE-Advanced, unless otherwise stated. Further, the present invention can be applicable to communication systems other than LTE.

Further, in the embodiment to be described below, terms that are used in existing LTE such as SRS, DM-RS, PUCCH, RRC, and DCI, will be used for convenience, but channels, signals, or functions similar to them may be referred to by different names.

(Configuration of Wireless Communication System)

FIG. 2 is a diagram illustrating a configuration of a wireless communication system 10 according to the embodiment of the present invention. As illustrated in FIG. 2, the wireless communication system 10 according to the present embodiment includes user equipments 101, 102, and 103 (hereinafter these may be generically referred to as a user equipment 100), and base stations 201, 202, and 203 (hereinafter these may be generically referred to as a base station 200). As mentioned earlier, in the embodiment to be described below, the wireless communication system 10 supports dynamic TDD capable of controlling UL and DL for each cell.

The user equipment 100 is a communication device equipped with a wireless communication function, such as a smartphone, a cellular phone, a tablet, a wearable terminal, or an M2M (Machine-to-Machine) communication module, and connects with the base station 200 wirelessly to use various communication services provided by the wireless communication system 10. The user equipment may also be referred to as "UE".

The base station 200 provides one or more cells, and performs wireless communication with the user equipment 100. In the example illustrated in the drawing, three base stations 201, 202, and 203 are present. However, in general, a large number of base stations 200 are provided to cover a service area of the wireless communication system 10. The base station may also be referred to as a "gNB".

Further, regarding a signal waveform used in the wireless communication system 10 of the present embodiment, for example, OFDMA that is used for DL in existing LTE may be used for both UL and DL, or SC-FDMA (used for UL in existing LTE) and OFDMA may be respectively used for UL and DL. Alternatively other signal waveforms may be used. It should be noted that the user equipment 100 in the present embodiment transmits an XSRS, which will be described later, as a UL signal. However, in the following description, a "UL signal" does not include an XSRS unless otherwise stated.

Further, the base stations are connected via a communication circuit (referred to as "backhaul"), and information can be transmitted and received between the base stations using an X2 interface. Furthermore, in the present embodiment, the base stations are synchronized. However, the base stations are not necessarily synchronized. When the base stations are not synchronized, time difference information is exchanged between the base stations to perform an effectively synchronized operation.

(Configuration of Dynamic TDD)

As mentioned earlier, because the dynamic TDD is used in the present embodiment, configuration examples of the dynamic TDD will be described.

Figure 3A:
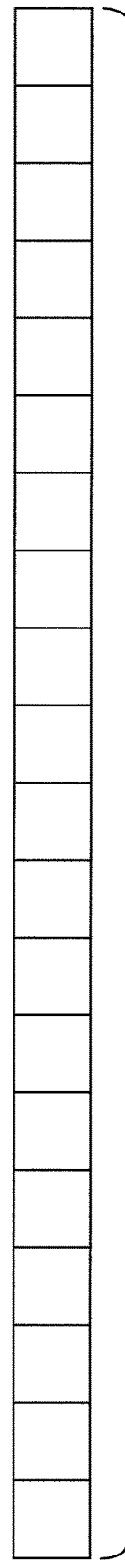
FIG. 3A is a diagram illustrating an example of a DL/UL pattern in the dynamic TDD.
Figure 3B:
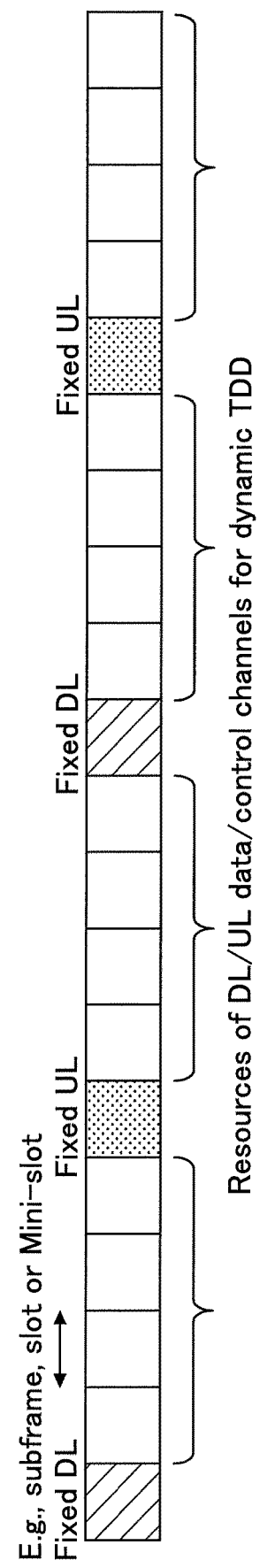
FIG. 3B is a diagram illustrating an example of a DL/UL pattern in the dynamic TDD.
Figure 3C:
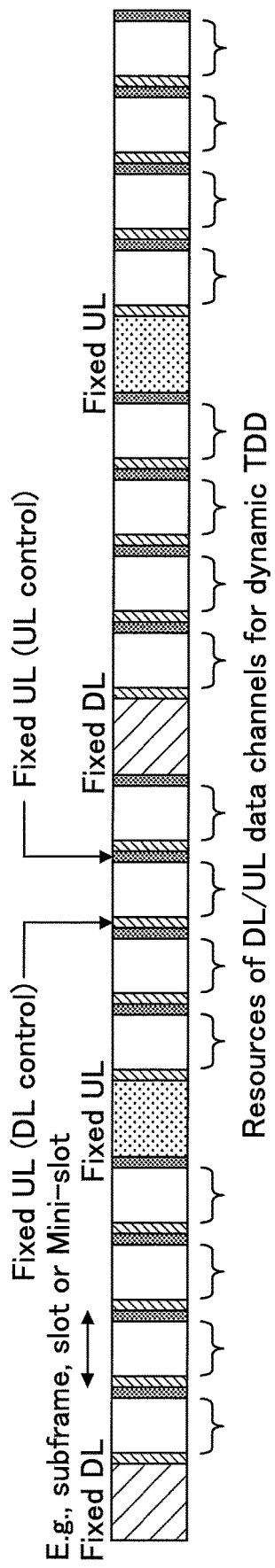
FIG. 3C is a diagram illustrating an example of a DL/UL pattern in the dynamic TDD.

In the dynamic TDD according to the present embodiment, a UL communication and a DL communication are performed in accordance with several UL/DL patterns, as illustrated in FIGS. 3A to 3C for example. However, UL/DL patterns are not limited to those mentioned here.

Pattern 1 in FIG. 3A represents a case in which both UL and DL communications are possible in every time interval. The "time interval" mentioned here is represented by a width of a rectangle (a length of an edge in which a label "E.g., subframe, slot or mini-slot" is attached) in FIG. 3A (or FIG. 3B or 3C). The "time interval" may be referred to as TTI.

In Pattern 2 illustrated in FIG. 3B, a direction of communication (UL/DL) is fixed in some of time intervals. During these time intervals, only a determined communication direction is allowed. However, in other time intervals, UL/DL switching can be made. In Pattern 3 illustrated in FIG. 3C, in some of time intervals and certain periods in a time interval, UL/DL is fixed (in the illustrated example, UL/DL is fixed in periods at both ends of a time interval), and only a determined communication direction is allowed during these time intervals. However, in other time intervals, either UL or DL communications can be performed.

Figure 4:
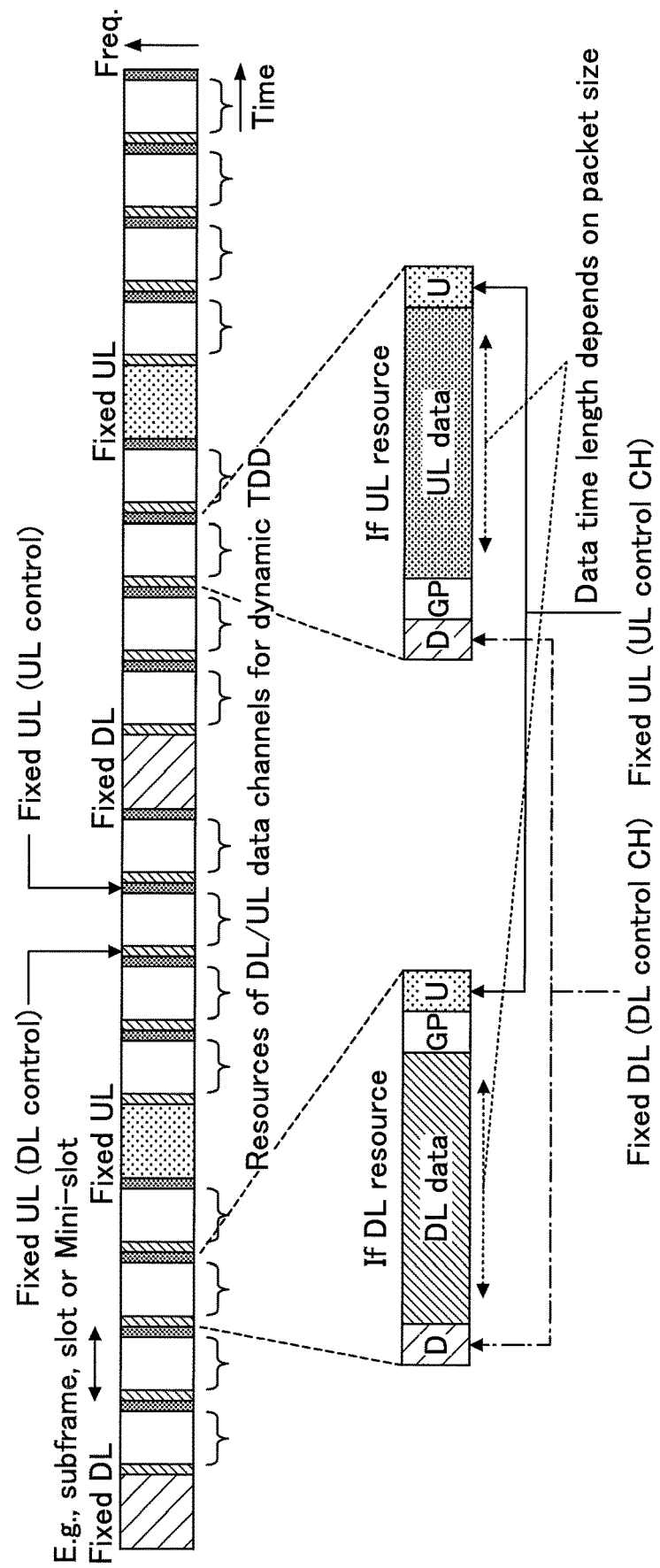
FIG. 4 is a diagram illustrating an example of a frame structure in the dynamic TDD.

FIG. 4 is a diagram illustrating a frame configuration according to the Pattern 3 in FIG. 3C in more detail. In the following, for convenience of description, the above "time interval" will be referred to as "slot". However, the "slot" to be mentioned below may be replaced with another unit, such as TTI (transmission time interval), or units of time length of a frame, a subframe, or a mini-slot. A time length of the slot may be a fixed length independent of time passage, or may be variable depending on a packet size or the like.

In this example, as illustrated in FIG. 4, a slot has a head time period for a downlink control channel (DL control channel section), a time period for a data communication (data section), and a tail time period for an uplink control channel (UL control channel section). Transmission may be performed using a slot configuration configured for the only needed channel as necessary, such as a slot configured by a downlink control channel (DL control channel section) and a time period for a data communication (data section). Also, at a border between DL and UL, a guard period (GP) for switching is provided.

As an example, a UL control CH may be transmitted in a short period of time (such as one symbol). Such a UL control CH having a short time period is referred to as "Short PUCCH".

(Interference Pattern)

Figure 5:
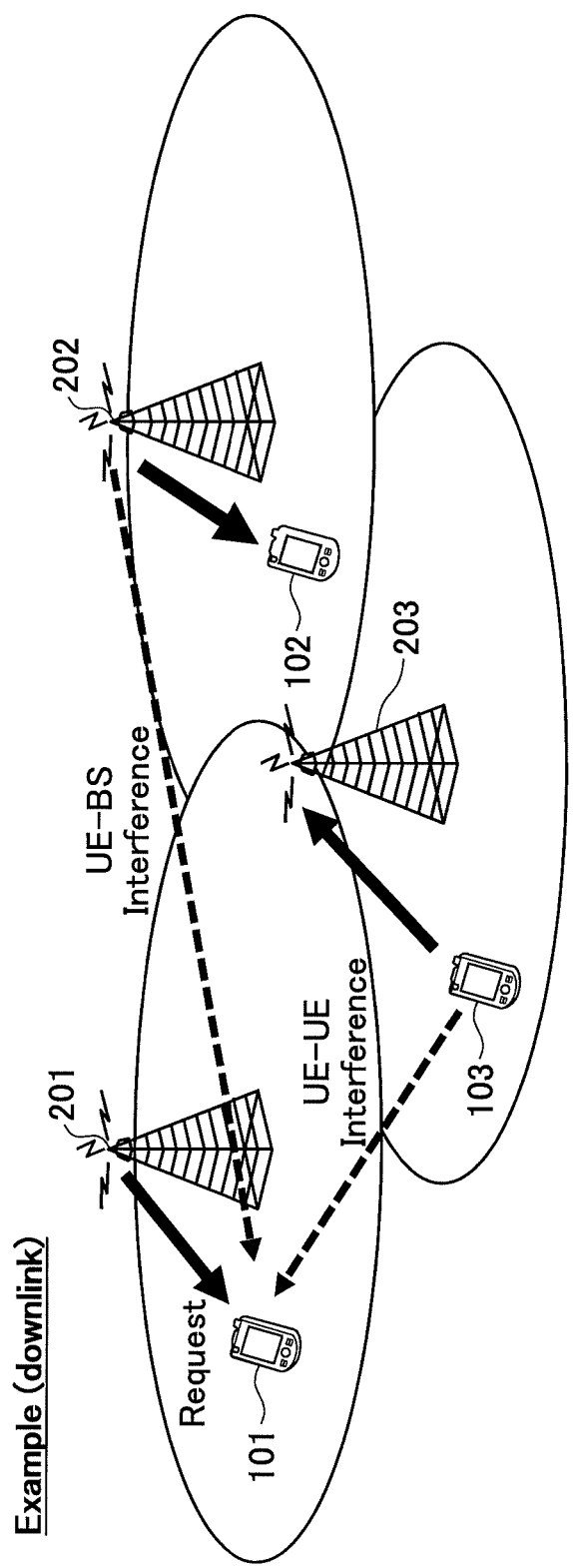
FIG. 5 is a diagram for describing DL interference pattern in a target cell.

Patterns of interference affecting the user equipment 100 that are assumed in the present embodiment will be described with reference to FIG. 5. In FIG. 5, let a cell of the base station 201 be a victim cell and let cells of the base stations 202 and 203 be aggressor cells. As illustrated in FIG. 5, a DL signal from a base station in an aggressor cell and a UL signal from a user equipment in an aggressor cell (user equipment 103 in FIG. 5) cause interference to the user equipment 101 in the victim cell. Especially, interference caused by the UL signal from the user equipment in the aggressor cell (user equipment 103 in FIG. 5) is an example of cross-link interference between DL and UL, and the effect of the interference is large in that, for example, a UL data channel from the user equipment 103 in the aggressor cell interferes with a DL control channel of the victim cell.

(Example of Basic Operation)

In the present embodiment, in the system configuration illustrated in FIG. 5 for example, the user equipment 103 in the aggressor cell transmits a reference signal, the user equipment 101 in the victim cell receives the reference signal, and the user equipment 101 measures received power of the reference signal. The user equipment 101 transmits a result of the measurement to the base station 201. In an actual environment, multiple user equipments in an aggressor cell transmit reference signals and multiple user equipments in a victim cell perform measurement of the reference signals and reporting of results of the measurement. However, in the example mentioned here, only the user equipment 103 and the user equipment 101 are illustrated, as an example.

If the base station 201 identifies that, for example, interference by an aggressor cell is large, based on the received measurement result from the user equipment 101, the base station 201 adjusts a communication direction in the resident cell (the cell in which the base station 201 resides) to mitigate interference. Alternatively, the base station 201 causes the base station 203 in the aggressor cell to adjust a communication direction by transmitting the measured result to the base station 203 in the aggressor cell.

The above reference signal may be an SRS (Sounding Reference Signal), a DM-RS (Demodulation Reference Signal), a CSI-RS (Channel State Information Reference Signal), a RACH (Random Access Channel) Preamble, or other signals. In the following, a reference signal used for UE-UE measurement is denoted by XSRS. However, as will be described below, there may be a case in which a conventional SRS is used as an XSRS. In this case, a reference signal used for UE-UE measurement may be referred to as an SRS.

Further, received power, which is a measurand of an XSRS, may be RSRP regulated by LTE, RSSI regulated by LTE, or other quantities. Alternatively, a measurand of an XSRS may be a received quality (RSRQ). In the following, description is made based on a premise that a measurand of an XSRS is RSRP.

It should be noted that every user equipment residing in each cell performs transmission of an XSRS, and measurement of an XSRS received from other cells.

Figure 6:
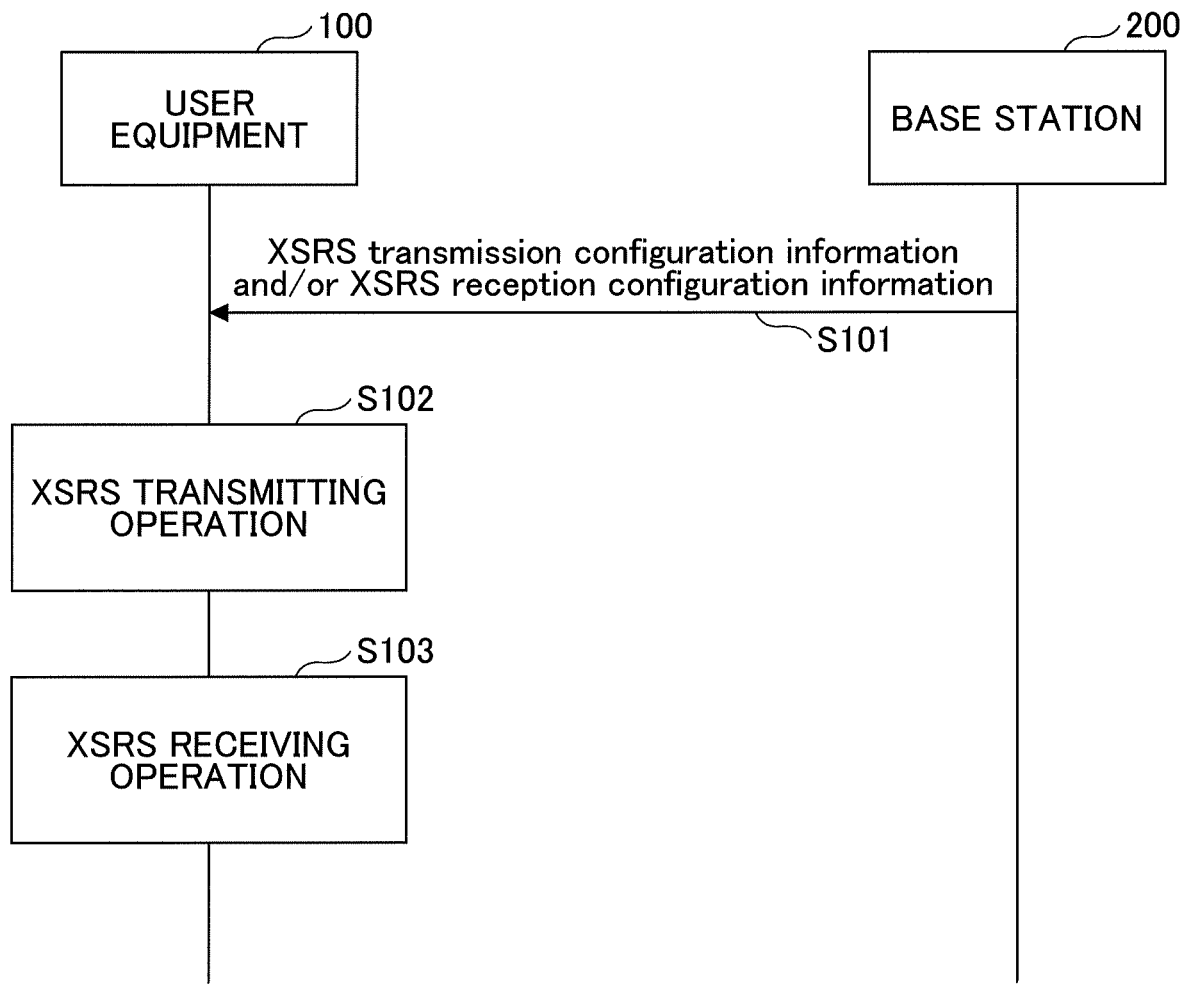
FIG. 6 is a diagram illustrating an example of a basic operation.

FIG. 6 is a diagram illustrating an example of a basic operation performed by the base station 200 and the user equipment 100 residing in a cell (serving cell) provided by the base station 200.

At S101 ("S" stands for "step"), the base station 200 transmits XSRS transmission configuration information and XSRS reception configuration information to the user equipment 100. The information transmission performed here is made, for example, by using broadcast information (may be referred to as system information), an RRC message, a MAC signal (such as a MAC CE), or DCI (PDCCH/EPDCCH).

If either the XSRS transmission configuration information or the XSRS reception configuration information is set to the user equipment 100 in advance, it is not necessary to transmit both of the above information at S101, and either of the above information may be transmitted.

The XSRS transmission configuration information includes information specifying a resource (a time resource and/or a frequency resource) for transmitting an XSRS. The XSRS transmission configuration information may also include information specifying a priority level to be described below, and/or information representing that a reference signal (such as an SRS) to be configured is for an XSRS (that is, for UE-to-UE measurement). The XSRS transmission configuration information may also include configuration information of a gap for XSRS transmission (such as a cycle of the gap, time length of the gap, or starting time location of the gap). In a case in which a conventional SRS is to be used as an XSRS, the XSRS transmission configuration information is configuration information for a conventional SRS.

The XSRS reception configuration information includes information specifying a resource (a time resource and/or a frequency resource) for receiving an XSRS. The XSRS reception configuration information may also include information specifying a priority level to be described below, and/or information representing that a reference signal (such as an SRS) to be configured is for an XSRS (that is, for UE-to-UE measurement). The XSRS reception configuration information may also include configuration information of a gap for XSRS reception (such as a cycle of the gap, time length of the gap, or starting time location of the gap).

The above resource for transmitting an XSRS is, for example, a resource that is configured for receiving an XSRS in other cells. The above resource for receiving an XSRS is, for example, a resource that is configured for transmitting an XSRS in other cells.

At step S102, the user equipment 100 performs an XSRS transmitting operation in accordance with the XSRS transmission configuration information. At step S103, the user equipment 100 performs an XSRS receiving operation in accordance with the XSRS reception configuration information.

(Transmitted Signal/Received Signal)

Figure 7:
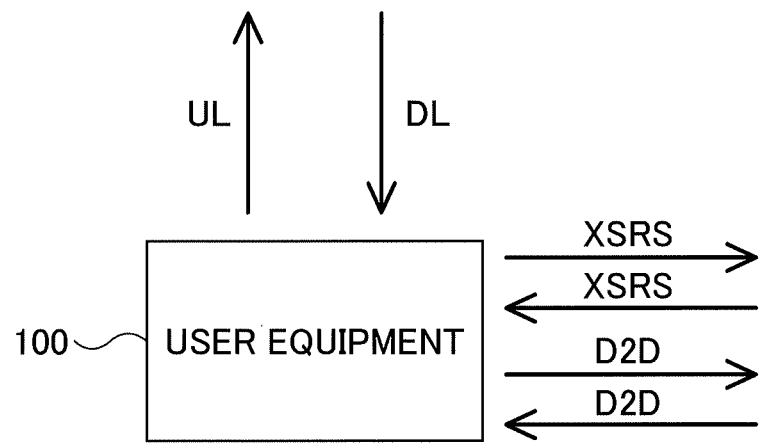
FIG. 7 is a diagram illustrating signals to be transmitted or received by user equipments 101 and 103.

FIG. 7 is a diagram illustrating signals to be transmitted or received by the user equipment 100 using a cell provided by the base station 200 as a serving cell. As illustrated in FIG. 7, the user equipment 100 receives a DL signal from the base station 200, and transmits a UL signal to the base station 200. The user equipment 100 also transmits and receives an XSRS and a D2D signal.

To the user equipment 100 transmitting an XSRS, resources are allocated such that an XSRS transmission is periodically performed at a predetermined timing. However, because the resource allocation is expected to be made on a per cell basis, transmission of an XSRS may contend with transmission of another signal in a certain user equipment.

Figure 8:
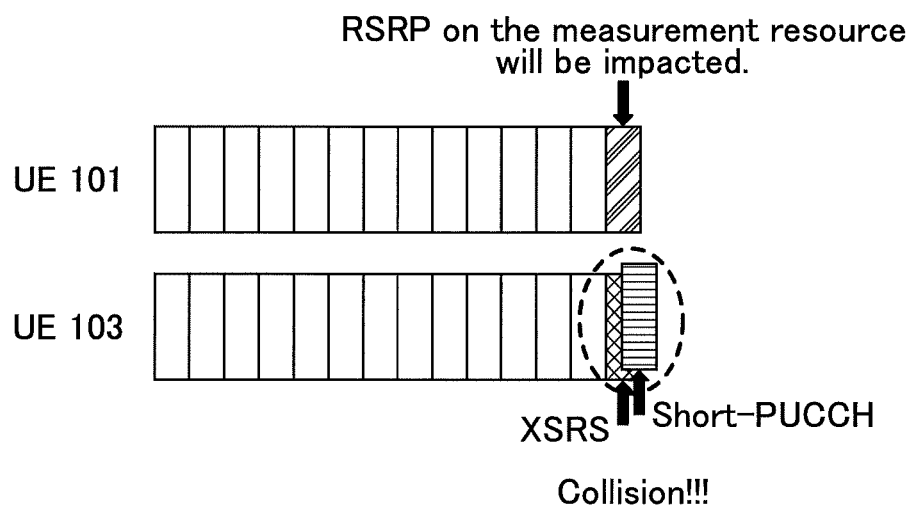
FIG. 8 is a diagram illustrating an example of a case in which an XSRS contends with a Short PUCCH.

FIG. 8 illustrates an example of the contention, in which transmission of an XSRS contends with transmission of a Short PUCCH at the user equipment 103 of the aggressor cell illustrated in FIG. 5. The contention means that only one signal can be transmitted at a certain point (such as a symbol or a slot). Though FIG. 8 illustrates a case in which resources of both signals coincide, the contention may occur even if the resources do not coincide. For example, because of a performance limitation of an UE, the contention may occur.

In the example illustrated in FIG. 8, the user equipment 101 in the victim cell is configured such that an XSRS is to be received at the corresponding symbol. Therefore, for example, if the user equipment 103 transmits a Short PUCCH and drops an XSRS, measurement cannot be performed at the user equipment 101 and precision of the measurement degrades. In another case, if the user equipment 103 drops Short PUCCH transmission and transmits an XSRS, the user equipment 100 can perform measurement but precision of UL/DL communication may degrade.

Accordingly, to resolve the above contention, by considering an overall system performance and the like, priority needs to be set appropriately.

The above example illustrates a case in which transmission of an XSRS contends with transmission of other signals. Besides the above example, in a user equipment having half-duplex limitation, XSRS transmission may contend with signal reception. Also, contention between reception of an XSRS and reception of other signals, or contention between reception of an XSRS and transmission of signals may occur.

In the following, as examples of methods for setting priority appropriately, example 1 and example 2 will be described.

Example 1

An XSRS described in example 1 is based on a conventional SRS. In example 1, two types of configuration of an SRS can be used.

A configuration of an SRS to be used as an XSRS (that is, used for UE-to-UE measurement) is referred to as an XSRS configuration, and a configuration of a conventional SRS (that is, an SRS for UL sounding) is referred to as an SRS configuration.

To identify whether the configuration information transmitted from the base station 200 to the user equipment 100 is for a conventional SRS or for an XSRS, for example, the following rule is applied to the configuration information. The configuration information for an XSRS contains identification information (type) representing that the configuration information is for an XSRS, and the configuration information for a conventional SRS does not contain the identification information. It should be noted that the identification information is contained in the XSRS transmission configuration information; however, the XSRS reception configuration information may also contain the identification information.

Also, to identify whether the configuration information is for a conventional SRS or for an XSRS, the configuration information may include a priority level without including the identification information (or in addition to the identification information) and the priority level may be used for identification. Specifically, the configuration information may be configured such that the priority level contained in the configuration information for an XSRS is different from that in the configuration information for a conventional SRS. For example, the configuration information for a conventional SRS contains a priority level indicating that priority of an SRS is lower than a UL signal (such as a Short PUCCH), and the configuration information for an XSRS contains a priority level indicating that priority of an SRS is higher than a UL signal (such as a Short PUCCH). It should be noted that the priority level is contained in at least one of the XSRS transmission configuration information and the XSRS reception configuration information.

The above example illustrates a case in which a priority level of an SRS used as an XSRS (that is, used for only UE-to-UE measurement) is lower than a priority level of an SRS that may be used for both UE-to-UE measurement and UL sounding (a conventional SRS).

Conversely, the priority of an SRS used as an XSRS (that is, used for only UE-to-UE measurement) may be higher than priority of an SRS that may be used for both UE-to-UE measurement and UL sounding (a conventional SRS).

In a case in which a priority level is not included in the configuration information, that is, a case in which the configuration information (for an XSRS) contains identification information representing that the configuration information is for an XSRS, the above mentioned rule of priority is applied to the SRS configuration containing the identification information.

Alternatively, with respect to a time resource for an SRS transmission having higher priority, a time pattern (such as a bitmap having repetitions in a time direction) may be transmitted from the base station 200 to the user equipment 100.

In example 1, some of transmission parameters for a conventional SRS and an XSRS may be common. In this case, when transmission parameters for an XSRS are transmitted, only part of the transmission parameters that is different from that for a conventional SRS is transmitted from the base station 200 to the user equipment 100. Accordingly, amount of the configuration information is reduced, and thereby an overhead is reduced.

In addition, for example, an overhead may be reduced by adopting a simplified configuration for an XSRS transmission. For example, with respect to a precoding and an antenna port for an XSRS transmission, predetermined values are used, and with respect to an amount of cyclic shift, a smaller value than the one used for a conventional SRS is used. Because an XSRS is used for inter-cell measurement, a path propagation delay is expected to be larger than in a conventional SRS. Therefore, it is preferable that an amount of cyclic shift is small. Further, regarding an XSRS, to attain more user multiplexing than a conventional SRS, comb spacing may be set to at most 4.

<Example of Priority Level>

An example of configuring priority levels of XSRS transmission, XSRS reception, DL reception, UL transmission, and D2D reception will be described below. Priority control to be described below is applied when contention occurs because of a performance limitation of a user equipment. However, the priority control may be applied regardless of a performance limitation of a user equipment. Further, the priority control can be applied when an XSRS is not based on an SRS. Also, the priority level to be described below may be set from the base station 200 to the user equipment 100, or may be preconfigured in the user equipment 100 without requiring a setting from the base station 200.

For example, a higher priority level is assigned to XSRS reception than that of D2D reception. By setting the above priority level, because the user equipment 100 can preferentially perform reception, measurement, and reporting of an XSRS than D2D reception, DL communication performance can be secured.

In the following, relations among the assigned priority levels will be expressed using an inequality. The priority levels may be configured such that "DL reception, UL transmission>XSRS transmission>XSRS reception". By prioritizing the DL reception and the UL transmission over the XSRS transmission and the XSRS reception, performance degradation of DL and UL can be avoided. Also, by prioritizing the XSRS transmission over the XSRS reception, waste of an XSRS reception resource (measurement resource) can be avoided. For example, occurrence of a case, in which an XSRS reception resource is allocated (and is not used for transmission) despite there being no possibility of receiving an XSRS, can be avoided.

The meaning that the user equipment 100 "does not receive an XSRS" based on a priority level when contention occurs is that the user equipment 100 does not perform a demodulation operation from an XSRS and/or that the user equipment 100 does not perform a measurement (such as measurement of a received power) operation.

Alternatively, for example, the priority levels may be configured such that "XSRS transmission>XSRS reception>DL reception>UL transmission". By this configuration, preciseness of UE-to-UE measurement can be maintained.

Alternatively, for example, the priority levels may be configured such that "DL reception>XSRS transmission>UL transmission>XSRS reception". By this configuration, preciseness of UE-to-UE measurement can be maintained while securing DL reception.

Concrete Example

A concrete example will be described with reference to FIG. 9. In an example illustrated in FIG. 9, with respect to the user equipment 103 in the aggressor cell, a symbol indicated by A is configured for XSRS transmission. Also, a symbol indicated by B is a symbol for conventional SRS transmission. Further, with respect to the user equipment 101 in the victim cell, a symbol indicated by A is configured for XSRS reception. Also, a priority level of XSRS transmission is higher than a priority level of PUCCH transmission, and a priority level of SRS transmission is smaller than a priority level of PUCCH transmission.

Figure 9:
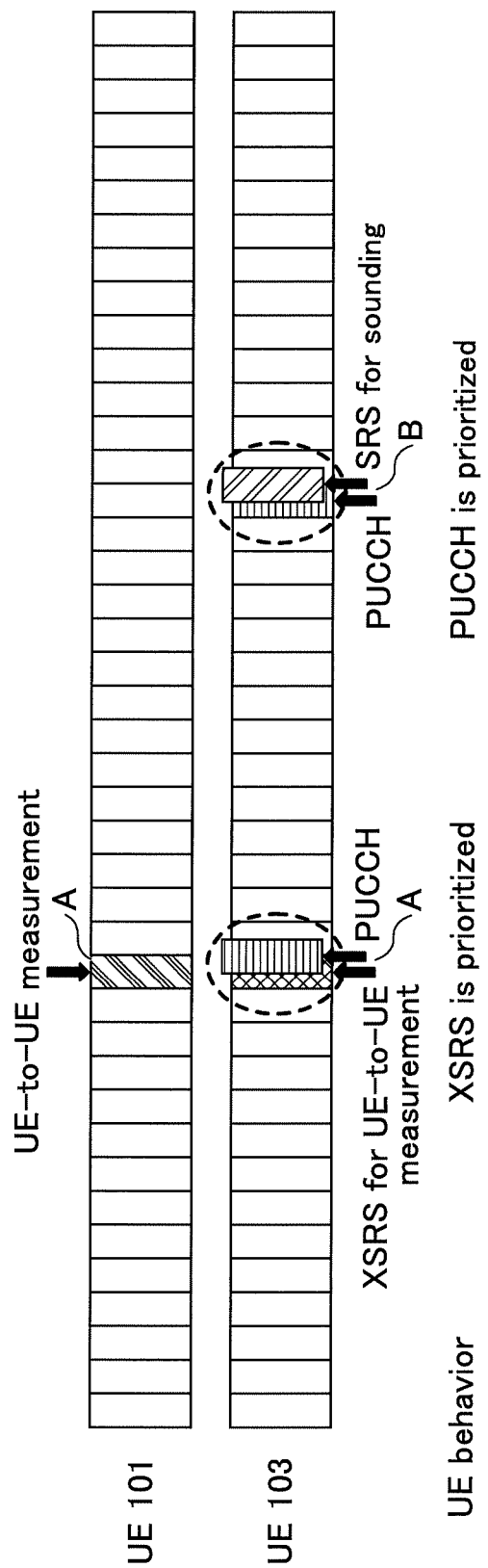
FIG. 9 is a diagram illustrating an example of XSRS transmission.

The example illustrated in FIG. 9 is a case in which XSRS transmission contends with PUCCH transmission at the symbol A. In this case, the XSRS transmission is prioritized and the PUCCH transmission is dropped. Because of this configuration, preciseness of measurement can be maintained. Additionally, in a case in which conventional SRS transmission contends with PUCCH transmission at the symbol B, the PUCCH transmission is prioritized and the SRS transmission is dropped. Because of this configuration, transmission of UL control information can be performed.

In example 1 in which the XSRS configuration and the conventional SRS configuration are used, the base station 203 may be configured such that the base station 203 does not schedule UL transmission with respect to a resource for XSRS transmission. By this configuration, the user equipment 103 can perform operations based on an assumption that, in transmitting an XSRS, XSRS transmission does not contend with UL transmission.

Figure 10:
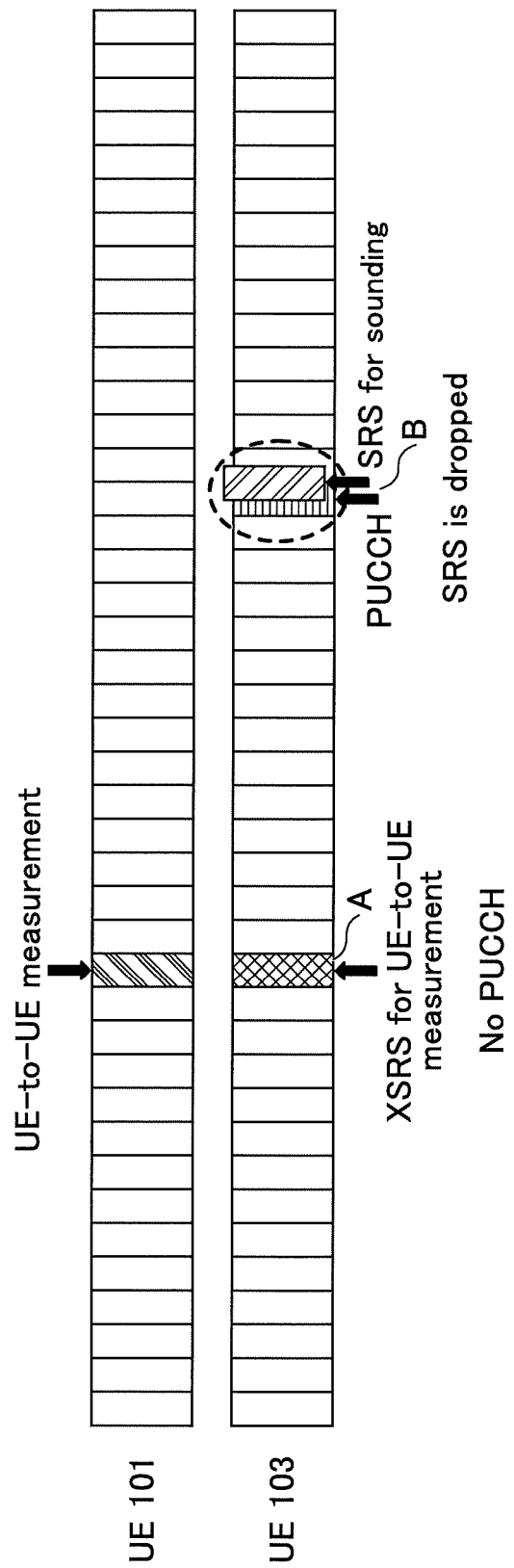
FIG. 10 is a diagram illustrating an example of XSRS transmission.

A concrete example is illustrated in FIG. 10. In this example, with respect to the user equipment 103, a symbol indicated by A is configured for XSRS transmission, which is not used for a PUCCH resource. Conversely, conventional SRS transmission may contend with PUCCH transmission. In the example illustrated in FIG. 10, PUCCH transmission is prioritized.

Example 2

In example 2, a conventional SRS and an XSRS are transparent. In other words, from the perspective of a user equipment in a transmitting side, there is no difference between a conventional SRS and an XSRS. That is, the user equipment 100 in the aggressor cell transmits an SRS without distinguishing a conventional SRS from an XSRS.

To a user equipment 100 receiving an SRS, the above mentioned XSRS reception configuration information is set by the base station 200. The XSRS reception configuration information includes, for example, a priority level.

To a user equipment 101 receiving an SRS (XSRS), the above mentioned priority control regarding XSRS reception is applied. For example, the priority levels such that "DL reception, UL transmission (including SRS transmission) >SRS reception" may be used. By this configuration, performance degradation of UL communication and UL communication caused by SRS reception can be avoided. Alternatively, the priority levels may be configured such that a priority level of SRS reception is higher than a priority level of D2D reception. By this configuration, DL performance can be secured.

In applying the priority control, the user equipment 100 performs priority control based on the priority levels included in the XSRS reception configuration information. Alternatively, when a configuration of XSRS reception is made by receiving the XSRS reception configuration information, the user equipment 100 may start using the above mentioned priority levels.

A concrete example of example 2 will be described with reference to FIG. 11. In an example illustrated in FIG. 11, the user equipment 103 in the aggressor cell is configured to transmit an SRS at symbols indicated by A, B, and C. In addition, a priority level of PUCCH transmission is larger than a priority level of SRS transmission.

In a case in which symbols B and C are configured as PUCCH resources of the user equipment 103 by the base station 203, the base station 203 transmits the configuration information to an adjacent base station (which is the base station 201 of the victim cell, in this example). The configuration information may contain priority level information.

Figure 11:
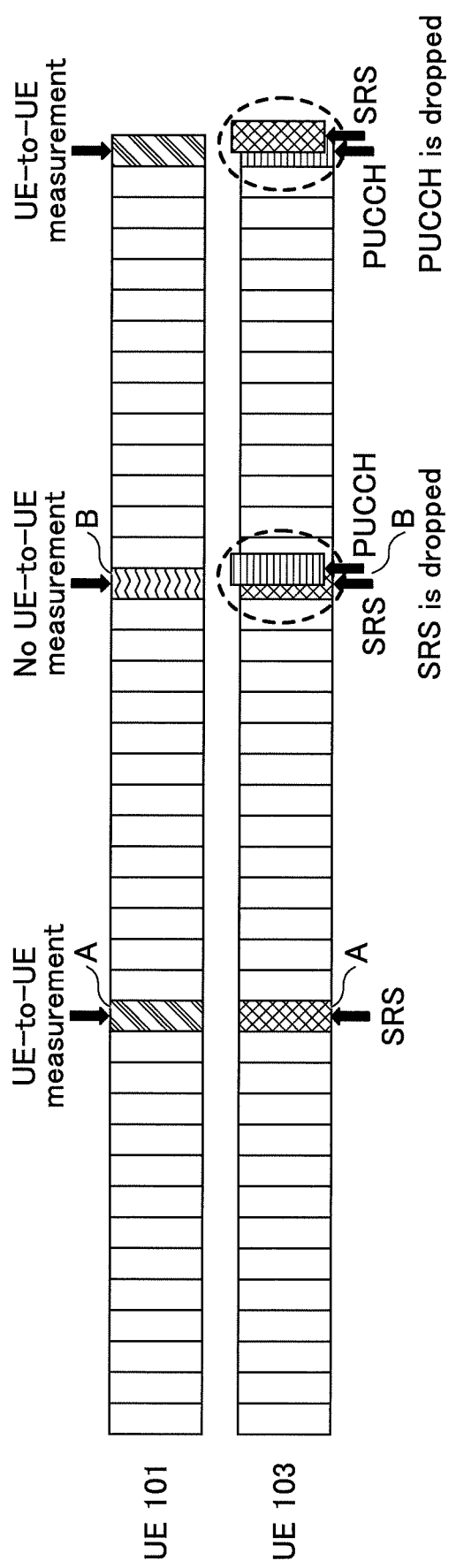
FIG. 11 is a diagram illustrating an example of XSRS transmission and reception.

In this case, as illustrated in the symbol B of FIG. 11, the base station 201 does not configure the resource as measurement resource (the resource may be used as other purposes). Further, when a measurement resource is preconfigured for example, the base station 201 may instruct the user equipment 101 to stop measurement using the measurement resource, by means of an RRC signaling or an L1 signaling (such as DCI).

Further, as illustrated in the symbol C of FIG. 11, when the base station 203 detects, based on information received from the base station 201, that the symbol C is configured as a measurement resource in the victim cell, the base station 203 may instruct the user equipment 103 to stop PUCCH transmission and to perform SRS transmission.

Example 3

Figure 12:
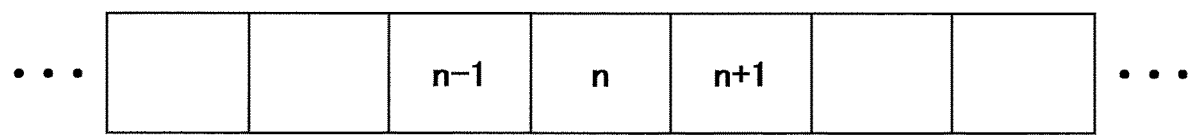
FIG. 12 is a diagram illustrating an example of applying priority.

Next, example 3 will be described. Example 3 can be applied to all of examples 1, 2, 4, and 5. Each of the priority level of XSRS transmission and the priority level of XSRS reception can be set, for example, on a per symbol basis. Provided that a symbol n illustrated in FIG. 12 is for XSRS transmission or XSRS reception, priority control is performed with respect to the symbol n. Also, considering transmission and reception switching, a symbol (n−1) and/or a symbol (n+1) may be a target of priority control, in addition to the symbol n. Though the above description illustrates a case in which a single symbol is used for XSRS transmission or XSRS reception, multiple symbols may be used for XSRS transmission or XSRS reception. That is, the above "symbol n" may be multiple symbols.

Further, in a case in which the priority level of XSRS transmission or the priority level of XSRS reception is set higher than the priority level of UL transmission, the user equipment 100 may prioritize specific UL transmission (such as PRACH transmission) over the XSRS transmission or the XSRS reception.

Further, instead of (or in addition to) performing XSRS reception configuration by receiving XSRS reception configuration information from a base station 200 of a serving cell, the user equipment 100 may perform UE-to-UE measurement by receiving system information transmitted from a base station of an adjacent cell (such as an adjacent cell of intra-band). For example, the user equipment 100 receives system information transmitted from a base station of an adjacent cell, and obtains configuration information (such as information about a transmission resource) of an SRS (or, may be an XSRS that is not an SRS) transmitted by a user equipment in the adjacent cell. Based on the configuration information, the user equipment 100 receives the SRS (or, may be an XSRS that is not an SRS) using a resource that the user equipment in the adjacent cell uses for transmitting the SRS (or, may be an XSRS that is not an SRS), to perform UE-to-UE measurement.

Example 4

Next, example 4 will be described. Example 4 can be applied to all of examples 1, 2, 3, and 5.

In example 4, at least one of a gap for XSRS transmission and a gap for XSRS reception is configured to the user equipment 100 from the base station 200. Instead of configuring the gap for XSRS transmission and the gap for XSRS reception that are distinct from each other, a gap usable for both XSRS transmission and XSRS reception may be configured to the user equipment 100 from the base station 200.

The above gaps are generically referred to as an XSRS gap. That is, the XSRS gap is a gap for XSRS transmission, a gap for XSRS reception, or a gap usable for both XSRS transmission and XSRS reception. In every gap, transmission and reception of signals other than an XSRS may be prohibited. Alternatively, transmission and reception of signals other than an XSRS may be allowed in every gap.

For example, when contention occurs because of a performance limitation of the user equipment 100, the user equipment 100 prioritizes XSRS transmission and/or XSRS reception over DL reception and/or UL transmission in the XSRS gap.

For example, when XSRS transmission contends with transmission or reception of another signal in the XSRS gap configured by the base station 200, the user equipment 100 transmits an XSRS. Also for example, when XSRS reception contends with transmission or reception of another signal in the XSRS gap configured by the base station 200, the user equipment 100 receives an XSRS. The meaning of "receiving an XSRS" mentioned here is equivalent to "measuring received power of an XSRS".

For example, with respect to XSRS transmission/reception resources other than the XSRS gap, even when the priority levels such that "DL reception, UL transmission>XSRS transmission>XSRS reception" are configured as described above, XSRS transmission and/or XSRS reception are prioritized over DL reception and/or UL transmission in the XSRS gap.

However, specific UL transmission and/or specific DL reception may be prioritized over XSRS transmission and/or XSRS reception even in the XSRS gap. An example of the specific DL transmission includes PRACH transmission (transmission of a RACH preamble). Also, an example of the specific DL reception includes reception of a DL synchronization signal, receptions of a DL broadcast signal, and reception of a DL reference signal.

Figure 13:
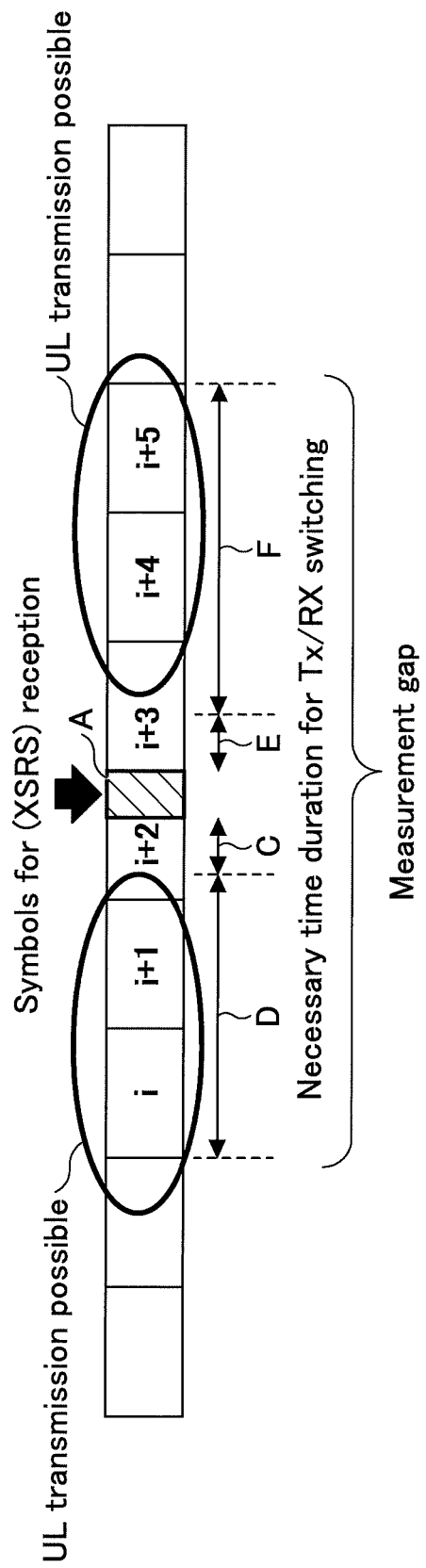
FIG. 13 is a diagram illustrating an example of a measurement gap.

Further, an operation as illustrated in FIG. 13 may be performed. FIG. 13 is a diagram illustrating an example of an XSRS gap configured to the user equipment 100. In the example illustrated in FIG. 13, 5 slots (may also be 5 symbols) from i to (i+5) are configured as an XSRS gap in the user equipment 100. The XSRS gap mentioned here is an example of a gap usable for both XSRS transmission and XSRS reception.

In the example illustrated in FIG. 13, the user equipment 100 receives an XSRS at symbols indicated by A. During time D that starts from a beginning of the slot i to a time point that is time C (C is a time length required for switching between transmission and reception) prior to the symbols indicated by A, UL transmission can be performed. Also, during time F that starts from a time point following a time E, which is after the symbols indicated by A, to an end of the slot (i+5) (note that E is a time length required for switching between transmission and reception), UL transmission can be performed.

A gap may be used for both XSRS measurement and DL measurement. For example, part of a conventional measurement gap for measuring a DL may be used as an XSRS gap for measuring an XSRS.

Figure 14:
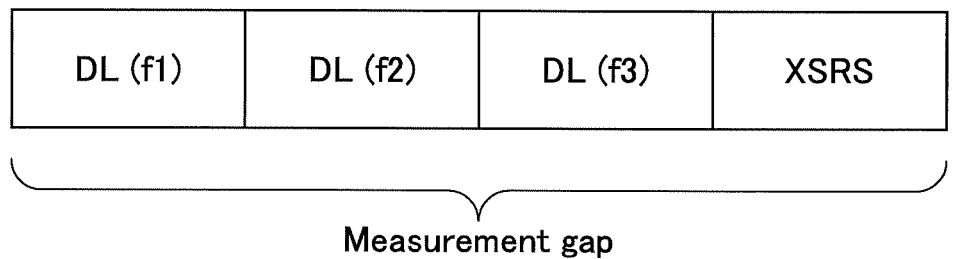
FIG. 14 is a diagram illustrating an example of a measurement gap.

An example of a gap used for both XSRS measurement and DL measurement is illustrated in FIG. 14. In the example illustrated in FIG. 14, the user equipment 100 using the illustrated gap performs measurement of an DL (measurement of frequencies f1, f2, and f3) during a period of time corresponding to three quarters of the gap, and performs measurement of an XSRS during a period of time corresponding to a quarter of the gap.

The period of time for XSRS measurement is adjusted based on a scaling factor configured by the base station 200 or a predetermined scaling factor. For example, the user equipment 100 calculates the period of time for XSRS measurement ($T_{SRS}$) by using the following formula, and performs XSRS measurement for the calculated period of time, out of a period corresponding to the gap used for both XSRS measurement and DL measurement.

$$T_{SRS} = T_{BASIC} \times (R_{SRS} \div (N_{freq,DL} + 1))$$

With respect to the above formula, $T_{SRS}$ is a time used for XSRS measurement. $T_{BASIC}$ is a sum of periods for DL measurement and XSRS measurement (such as a time length of a gap to be configured). $N_{freq,DL}$ is the number of frequencies to be measured (such as the number of inter-frequencies, inter-carriers, or inter-RAT). $R_{SRS}$ is a scaling factor for DL measurement and XSRS measurement.

For example, $R_{SRS}$ is a value satisfying the condition of $0 \leq R_{SRS} < 1$. However, $R_{SRS}$ may be 1 or more than 1. $R_{SRS}$ may be also configured by an upper layer signaling, or may be configured in advance. In a case in which $R_{SRS}$ is 1, a time for measuring an XSRS is equal to a time for measuring one of the different frequencies in a DL.

It should be noted that a measurement gap for DL measurement is not required to be used for XSRS measurement. In this case, XSRS measurement is performed using an XSRS gap configured for an XSRS. By this configuration, DL measurement can be preserved from XSRS measurement.

The measurement gap may be transmitted by means of a backhaul signaling. By transmitting the gap, an XSRS can be transmitted in a time when a gap is configured.

Example 5

Next, example 5 will be described. In example 5, dropping of XSRS transmission is described. Example 5 can be applied to all of examples 1, 2, 3, and 4. In example 5, descriptions of operations in a transmitting side and a receiving side will be made separately.

<Transmitting Side>

When XSRS transmission contends with transmission of another signal because of a performance limitation of the user equipment 100, the user equipment 100 may drop the XSRS transmission based on the above mentioned relations among the assigned priority levels and/or the gap configuration. However, regardless of the performance limitation of the user equipment 100, the dropping to be described below may be performed when contention occurs.

As an example, the user equipment 100 performs dropping of XSRS transmission in a gap for XSRS reception. In another case, the user equipment 100 performs dropping of XSRS transmission in a measurement gap for DL measurement configured by the base station 200.

Alternatively, with respect to opportunity for transmitting an XSRS, the user equipment 100 performs dropping of XSRS transmission during a time section configured by the base station 200 or during a predetermined time section. The time section corresponds to, for example, one or more symbols. The user equipment 100 may autonomously determine the symbol in which the dropping of the XSRS transmission is to be performed. Examples of the "opportunity for transmitting an XSRS" include an XSRS transmission resource configured by the XSRS transmission configuration information, and a gap for XSRS transmission configured by the XSRS transmission configuration information.

For example, when a part of a time section in the opportunity for transmitting an XSRS coincides with a time section for DL measurement or XSRS measurement, the user equipment 100 performs dropping of XSRS transmission in the coinciding time section to enable measurement.

Alternatively, for example, dropping of XSRS transmission by the user equipment 100 may be performed when an instruction (scheduling) for DL reception is received from the base station 200. The user equipment 100 may also perform dropping of XSRS transmission in a symbol in which UL transmission or XSRS transmission is prohibited by the base station 200, or in a DL symbol designated by the base station 200. Alternatively, the user equipment 100 may also perform dropping of XSRS transmission unless an instruction of transmitting a UL or an XSRS is received. By performing the operation, the base station 200 can stop unexpected XSRS transmission.

<Receiving Side>

When a user equipment in the transmitting side performs dropping of XSRS transmission, a problem may arise that precision of XSRS measurement degrades in the reception side user equipment.

Therefore, in the present embodiment, by using a method based on a Layer 3 filtering described in Non-Patent Document 1, degradation of precision of measurement, which is caused by dropping of XSRS transmission, will be avoided.

Specifically, when a measured result acquired in a physical layer (such as RSRP) is smaller than a predetermined threshold (which may be configured by the base station 200 or may be a preconfigured value) (or when a measured result acquired in a physical layer is larger than a predetermined threshold (which may be configured by the base station 200 or may be a preconfigured value)), the user equipment 100 will not transmit the measured result to an upper layer. Alternatively, when a measured result transmitted from a physical layer to an upper layer is smaller than a predetermined threshold (or larger than a predetermined threshold), the upper layer may ignore the measured result (that is, the upper layer will not utilize the measured result for calculation in the below formula).

Thereafter, the user equipment 100 calculates the measured result in the upper layer based on the formula described below, and reports the result to the base station 200.

$$F_n = (1-\alpha) \times F_{n-1} + \alpha M_n$$

With respect to the above formula, $M_n$ is the most recent measured result received from the physical layer. $F_n$ is an updated filtered measured result. $F_{n-1}$ is a previous measured result. Note that $F_0$ is set to $M_1$ when a first measured result is received from the physical layer. $\alpha$ is, for example, $\frac{1}{2}^{(k/4)}$, in which k is a value set from the base station 200 to the user equipment 100 for example. However, this is merely an example, and $\alpha$ may be set from the base station 200 to the user equipment 100. Alternatively, $\alpha$ may be a preconfigured value.

Figure 15:
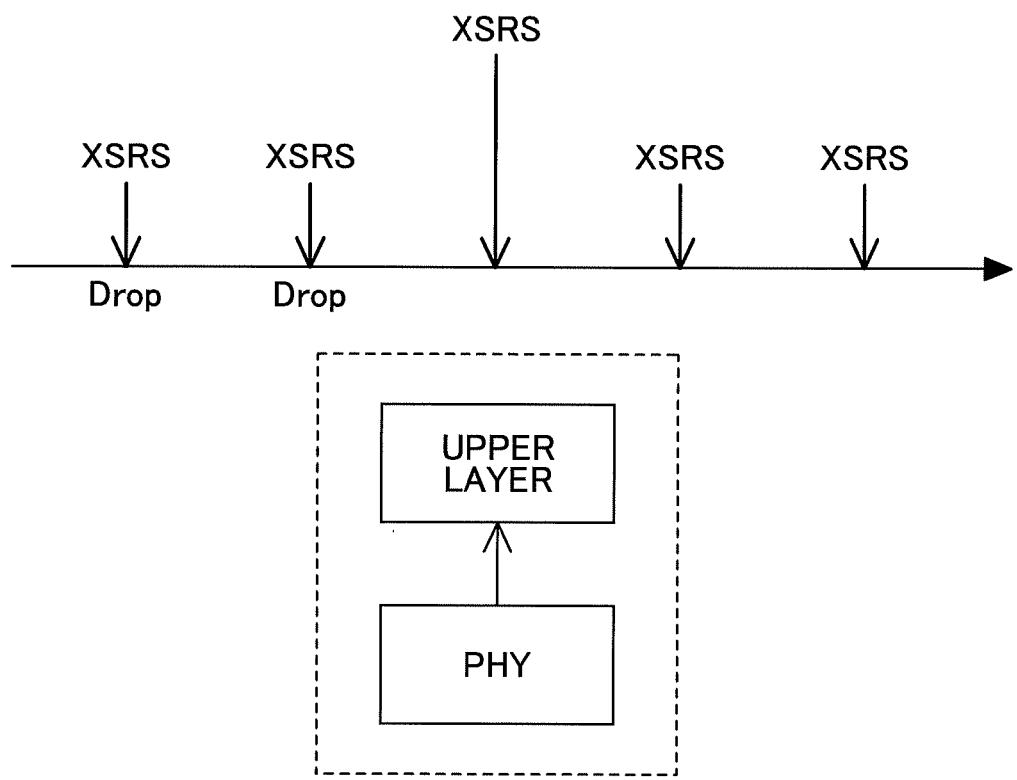
FIG. 15 is a diagram for describing XSRS dropping.

An example of an operation will be illustrated in FIG. 15. In the example illustrated in FIG. 15, as a result of first and second XSRS reception, since the user equipment 100 determines that these measured results (received power) are less than a threshold, the user equipment 100 does not use the measured results (drops the results). Similar operations are performed with respect to fourth and fifth measured results. Regarding a third measurement, because the third measured result (received power) is larger than the threshold, the measured result is passed from the physical layer to the upper layer, and a filtered measured result is calculated based on the above formula. The measured result is transmitted to the base station 200 based on, for example, a predetermined reporting trigger (such as when a periodic timing arrives).

Though the above example describes a case in which a measured result is acquired in the physical layer and in which filtering is made in the upper layer (such as layer 3), this is merely an example. Measurement (acquiring a measured result) or filtering may be performed in any layer.

If the user equipment 100 cannot acquire a measured result larger than the threshold sufficiently, the user equipment 100 for example transmits to the base station 200 information indicating that no interference occurs (or little interference occurs). Alternatively, if the user equipment 100 cannot acquire a measured result larger than the threshold sufficiently, the user equipment 100 may report a predetermined minimum value to the base station 200.

By performing filtering of a measured result larger than a threshold as described in example 5, presence of interference can be determined accurately.

Transmission power of an XSRS may be the same power as a conventional SRS or a PUSCH, or the magnitude of the transmission power of an XSRS may be a value in which an offset is added to the same power. Alternatively, the transmission power of an XSRS may be configured by a transmission power parameter different from a conventional SRS or a PUSCH, or an absolute value of the transmission power of an XSRS may be different from the power of a conventional SRS or a PUSCH. Configuration of the transmission power is made by, for example, an upper layer signaling. In the former case, an interference level of a data channel can be estimated. In the latter case, a propagation loss caused by an interfering user equipment can be estimated.

In addition, when a RACH Preamble is used for transmitting an XSRS, the user equipment may perform transmission in a configured transmission power without using Power ramping, based on a signaling (trigger) from the base station. In response to a transmission trigger, the user equipment may perform one transmission or predetermined (or pre-configured) numbers of transmissions. Because a user equipment in a connected state transmits a RACH preamble very rarely, the predetermined number of multiplexes is secured, and a RACH Preamble can be detected in a coarse synchronization, it is preferable to use a RACH Preamble as an XSRS when measuring UE-to-UE interference in a low frequency. In the scope of the present specification and claims, a RACH Preamble is an example of a reference signal.

(Configuration of Devices)

Next, an example of functional configurations of the user equipment 100 and the base station 200 performing operations described above will be explained. Each of the user equipment 100 and the base station 200 embodies functions disclosed in the present embodiment. Alternatively, each of the user equipment 100 and the base station 200 may embody part of the functions disclosed in the present embodiment. For example, among a function to practice example 1, a function to practice example 2, a function to practice example 3, a function to practice example 4, and a function to practice example 5, each of the user equipment 100 and the base station 200 may embody all of the functions, some of the functions, or one of the functions.

<User Equipment 100>

Figure 16:
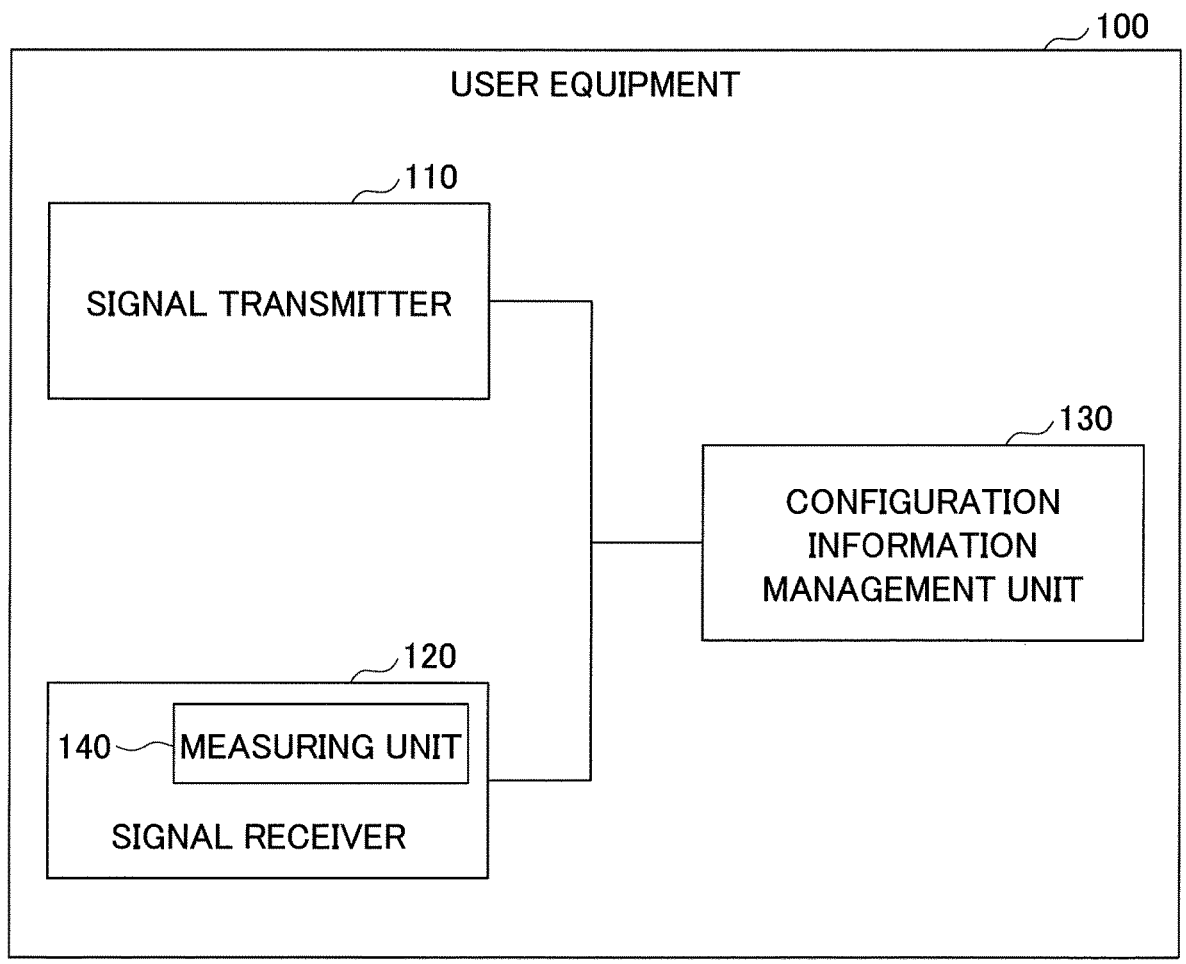
FIG. 16 is a diagram illustrating a functional configuration of a user equipment 100.

FIG. 16 is a diagram illustrating a functional configuration of the user equipment 100. As illustrated in FIG. 16, the user equipment 100 includes a signal transmitter 110, a signal receiver 120, and a configuration information management unit 130. The signal receiver 120 includes a measuring unit 140. The functional configuration illustrated in FIG. 16 is simply an example. Any types of division of function may be applicable and each of the functions may have an arbitrary name, as long as the operations according to the present embodiment can be practiced.

The signal transmitter 110 is configured to generate a signal of a lower layer from information of an upper layer, and to transmit the signal wirelessly. The signal receiver 120 receives various types of signals wirelessly, and obtains information of an upper layer from the received signals. The signal receiver 120 also measures received power, by using the measuring unit 140. Also, as described in the above embodiment, when an XSRS contends with another signal, the signal transmitter 110 determines whether the XSRS is to be transmitted or not, based on a priority level and the like, and if it is determined that the XSRS is to be transmitted, the signal transmitter 110 transmits the XSRS. The signal transmitter 110 also has a function to report a measured result by the signal receiver 120 to the base station 200. Also, as described in the above embodiment, when an XSRS contends with another signal, the signal receiver 120 determines whether the XSRS is to be received or not, based on a priority level and the like, and if it is determined that the XSRS is to be received, the signal receiver 120 receives the XSRS. The signal receiver 120 also has a function to perform filtering as described in example 5.

The configuration information management unit 130 includes a storage unit storing pre-configured configuration information and storing configuration information transmitted from the base station 200 and the like dynamically or semi-statically.

For example, the configuration information management unit 130 retains configuration information for transmitting a reference signal used for measuring interference in other user equipments, and the signal transmitter 110 transmits the reference signal based on the configuration information. For example, when the transmission of the reference signal contends with transmission or reception of another signal, the signal transmitter 120 determines whether the reference signal is to be transmitted or not based on a predetermined priority level.

When the transmission of the reference signal contends with transmission or reception of the another signal in a gap configured by the base station 200, the signal transmitter 120 transmits the reference signal.

Further for example, the configuration information management unit 130 retains configuration information for receiving a reference signal used for measuring interference, and the signal receiver 120 receives the reference signal based on the configuration information. For example, when the reception of the reference signal contends with transmission or reception of another signal, the signal receiver 120 determines whether the reference signal is to be received or not based on a predetermined priority level.

When the reception of the reference signal contends with transmission or reception of the another signal in a gap configured by the base station 200, the signal receiver 120 transmits the reference signal. The signal receiver 120 also measures received power of the reference signal, and performs filtering of received power larger than a predetermined threshold.

<Base Station 200>

Figure 17:
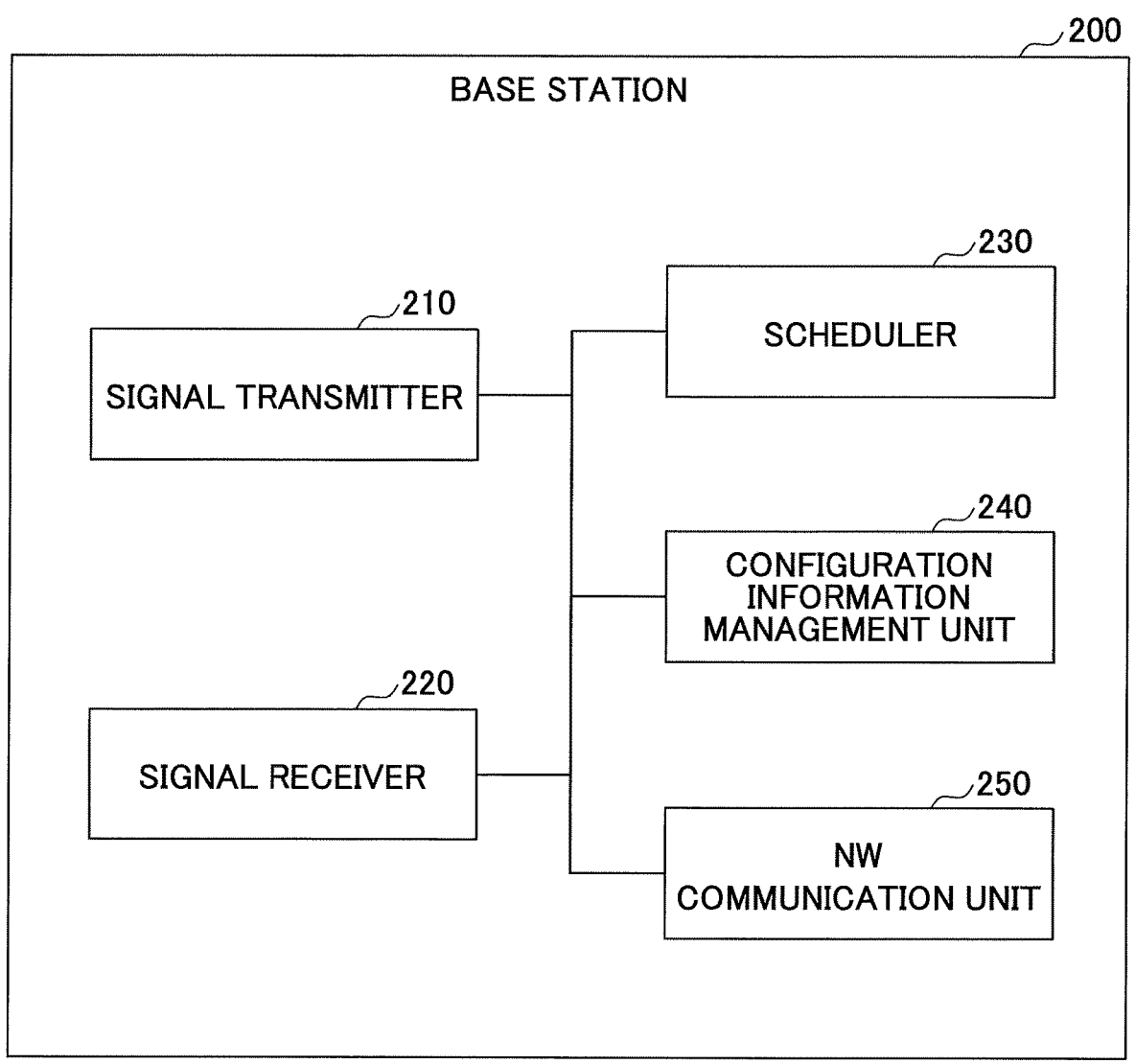
FIG. 17 is a diagram illustrating a functional configuration of a base station 200.

FIG. 17 is a diagram illustrating a functional configuration of the base station 200. As illustrated in FIG. 17, the base station 200 includes a signal transmitter 210, a signal receiver 220, a scheduler 230, a configuration information management unit 240, and an NW communication unit 250.

The functional configuration illustrated in FIG. 17 is merely an example. Any types of division of function may be applicable and each of the functions may have an arbitrary name, as long as the operations according to the present embodiment can be practiced.

The signal transmitter 210 is configured to to generate a signal of a lower layer from information of an upper layer, and to transmit the signal wirelessly. The signal receiver 220 is configured to receive various types of signals wirelessly, and to obtain information of an upper layer from the received signal.

The scheduler 230 performs operations such as resource allocation to the user equipment 100. For example, based on a measured result received from the user equipment 100 by the signal receiver 220, the scheduler 230 performs scheduling so as to avoid interference.

The configuration information management unit 240 includes a storage unit storing pre-configured configuration information and storing configuration information to be configured to the user equipment 100 dynamically or semi-statically. The NW communication unit 250 performs, with other base stations, transmission and reception of various information, such as XSRS transmission configuration information, XSRS reception configuration information, and scheduling information for signal transmission/reception by user equipments.

<Hardware Configuration>

The block diagrams used for explaining the above embodiment (FIG. 16 and FIG. 17) illustrate blocks on a per functional block basis. These functional blocks (configuration units) are embodied by any combination of hardware and/or software. Further, an implementation method of these functional blocks is not limited to a specific one. That is, each functional block may be embodied by an apparatus in which multiple elements are physically and/or logically coupled to each other, or may be embodied by multiple physically and/or logically separated apparatuses that are connected (with a wire connection or a wireless connection, for example) directly and/or indirectly each other.

Figure 18:
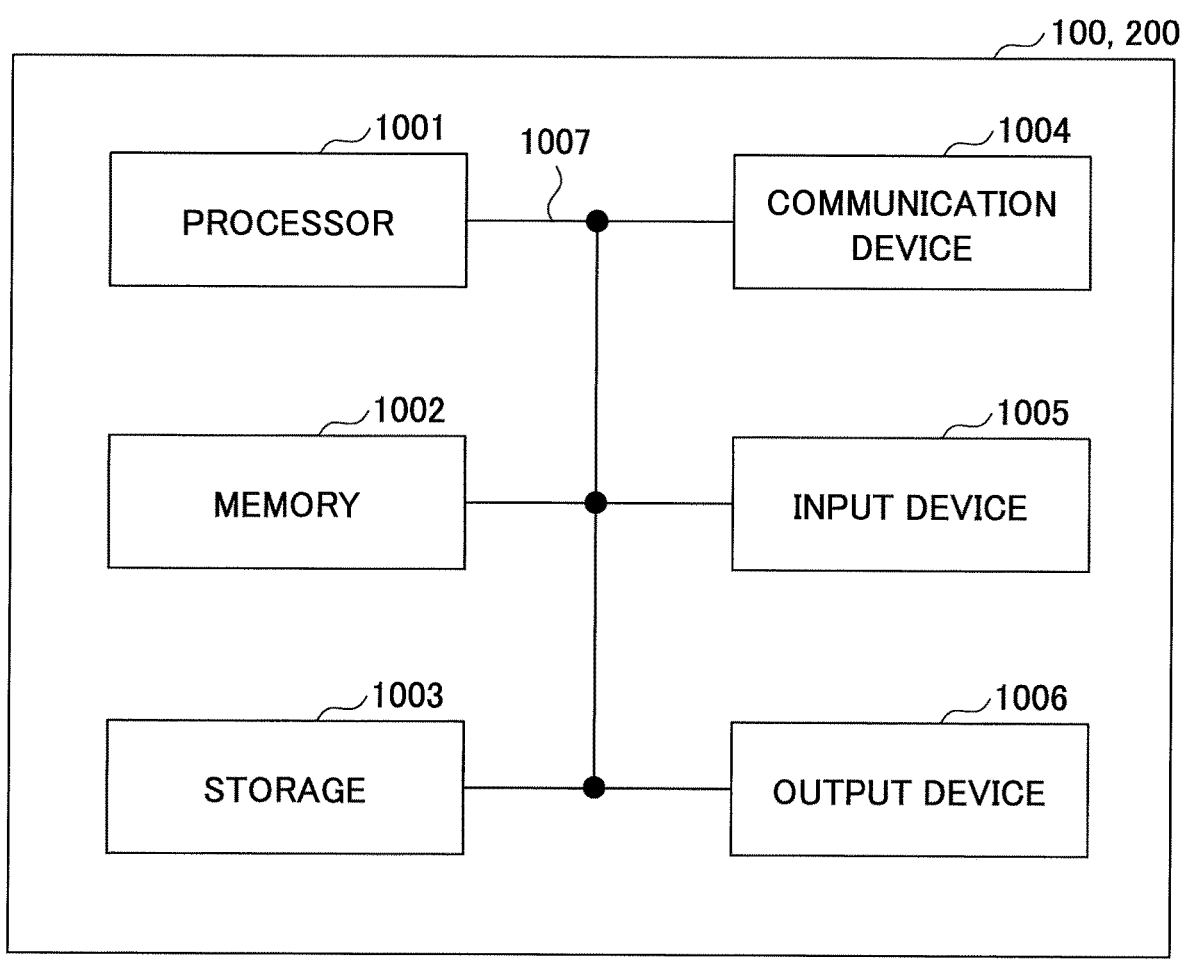
FIG. 18 is a diagram illustrating an example of a hardware configuration of the user equipment 100 and the base station 200.

Further, for example, both the user equipment 100 and the base station 200 according to an embodiment of the present invention may be a computer performing processes according to the present embodiment. FIG. 18 is a diagram illustrating an example of a hardware configuration of the user equipment 100 and the base station 200 according to the present embodiment. Each of the user equipment 100 and the base station 200 mentioned above may be configured as a computing device including a processor 1001, a memory 1002, storage 1003, a communication device 1004, an input device 1005, an output device 1006, and a bus 1007.

Note that the term "device" may be deemed to be replaced with a circuit, an apparatus, or a unit. With respect to a hardware configuration of the user equipment 100 and the base station 200, the number of each device specified with the elements 1001 to 1006 in the drawing, which are included in the user equipment 100 and the base station 200, may be one or more. Further, part of the devices may not be included in the user equipment 100 and the base station 200.

Each function of the user equipment 100 and the base station 200 is embodied by the processor 1001 performing arithmetic operations, and controlling communication via the communication device 1004 and data read and/or write on the memory 1002 and the storage 1003, by loading a given program (software) on the hardware such as the processor 1001 or the memory 1002.

The processor 1001 performs overall control of the computer, by executing an operating system, for example. The processor 1001 may be configured by a central processing unit (CPU) including an interface with peripheral devices, a controller device, an arithmetic unit, a register, and the like.

The processor 1001 further performs various processes in accordance with a program (program code), a software module, or data, loaded from the storage 1003 and/or the communication device 1004 onto the memory 1002. The program used here is a program for causing a computer to perform at least part of the operations described in the above embodiment. For example, the signal transmitter 110, the signal receiver 120, the configuration information management unit 130, and the measuring unit 140 in the user equipment 100 illustrated in FIG. 16 may be implemented by a control program stored in the memory 1002 and executed by the processor 1001. Also for example, the signal transmitter 210, the signal receiver 220, the scheduler 230, the configuration information management unit 240, and the NW communication unit 250 in the base station 200 illustrated in FIG. 17 may be implemented by a control program stored in the memory 1002 and executed by the processor 1001. In the above description, a case in which each of the above various processes is executed by a single processor 1001 has been explained, but the processes may be executed by two or more processors 1001 in parallel or sequentially. The processor 1001 may be implemented by one chip or more than one chips. Note that the program may be from a network via an electric telecommunication line.

The memory 1002 is a computer-readable recording medium, and may be configured by at least one of ROM (Read Only Memory), EPROM (Erasable Programmable ROM), EEPROM (Electrically Erasable Programmable ROM), RAM (Random Access Memory), and the like. The memory 1002 may be referred to as a register, a cache, a main memory, or the like. The memory 1002 can retain an executable program (program code) or software module necessary for performing the processes according to the embodiment of the present invention.

The storage 1003 is a computer-readable recording medium, and may be configured by at least one of an optical disk such as a CD-ROM (Compact Disc ROM), a hard disk drive, a flexible disk, a magneto-optical disk (such as a compact disc, a digital versatile disc, a Blu-ray disc (registered trademark)), a smartcard, a flash memory (such as a card, a stick, or a key drive), a floppy disk (registered trademark), and a magnetic stripe. The storage 1003 may be referred to as an auxiliary storage device. The above storage media may be a medium for a database, a server, or the like, including the memory 1002 and/or the storage 1003.

The communication device 1004 is hardware (transmission and reception device) for performing communication between computers through a wired and/or wireless network, and is also referred to as, for example, a network device, a network controller, a network card, a communication module, or the like. For example, the signal transmitter 110 and the signal receiver 120 in the user equipment 100 may be implemented by the communication device 1004. Also for example, the signal transmitter 210 and the signal receiver 220 in the base station 200 may be implemented by the communication device 1004.

The input device 1005 is an input device for receiving an input from outside (such as a keyboard, a mouse, a microphone, a switch, a button, or a sensor). The output device 1006 is an output device for performing output to outside (such as a display, a speaker, or an LED lamp). Note that the input device 1005 and the output device 1006 may be integrated into a single device (for example, a touch panel).

Further, each of the devices such as the processor 1001 and the memory 1002 is connected via the bus 1007 for communication. The bus 1007 may be a single bus, or the devices may be connected via different buses.

Further, the user equipment 100 and the base station 200 may include hardware, such as a microprocessor, a digital signal processor (DSP), an ASIC (Application Specific Integrated Circuit), a PLD (Programmable Logic Device), or an FPGA (Field Programmable Gate Array). Part of or all of each functional block may be implemented by the above hardware. For example, the processor 1001 may be implemented by at least one of the hardware.

Summary of Embodiment

As described above, according to the present embodiment, there is provision of a user equipment in a wireless communication system. The user equipment includes a configuration information management unit configured to retain configuration information for transmitting a reference signal used for measuring interference in other user equipments, and a signal transmitter configured to transmit the reference signal based on the configuration information. When transmission of the reference signal contends with transmission or reception of another signal, the signal transmitter determines whether the reference signal is to be transmitted or not based on a predetermined priority level. According to the above configuration, a technique can be provided used in UE-to-UE measurement to enable a user equipment to appropriately send or receive a reference signal for measurement of interference.

When the transmission of the reference signal contends with the transmission or the reception of the another signal in a gap configured by the base station, the signal transmitter transmits the reference signal. According to the configuration, an opportunity to transmit a reference signal can be secured. Therefore, UE-to-UE measurement can be performed efficiently.

Also according to the present embodiment, there is provision of a user equipment in a wireless communication system. The user equipment includes a configuration information management unit configured to retain configuration information for receiving a reference signal used for measuring interference, and a signal receiver configured to receive the reference signal based on the configuration information. When reception of the reference signal contends with transmission or reception of another signal, the signal receiver determines whether the reference signal is to be received or not based on a predetermined priority level. According to the above configuration, a technique can be provided used in UE-to-UE measurement to enable a user equipment to appropriately send or receive a reference signal for measurement of interference.

When the reception of the reference signal contends with the transmission or the reception of the another signal in a gap configured by the base station, the signal receiver receives the reference signal. According to the configuration, an opportunity to transmit a reference signal can be secured. Therefore, UE-to-UE measurement can be performed efficiently.

The signal receiver measures received power of the reference signal, and may perform filtering of the received power larger than a predetermined threshold. According to the configuration, even if a reference signal is dropped by a sender of the reference signal, an appropriate measured result can be obtained in a receiving side.

Supplement of Embodiment

Although the embodiment of the present invention has been described, a person skilled in the art will understand various variations, modifications, alternatives, replacements, and the like. Specific examples of numerical values have been used in the description in order to facilitate understanding of the invention. However, these numerical values are merely an example, and any other appropriate values may be used, unless otherwise stated. The separations of the items in the above description are not essential to the present invention. Depending on necessity, subject matter described in two or more items may be combined and used, and subject matter described in an item may be applied to subject matter described in another item (if they do not contradict). A boundary of a functional unit or a processing unit in the functional block diagrams may not necessarily correspond to a boundary of a physical component. Operations performed by multiple functional units may be executed in a single physical component, or an operation of a single functional unit may be executed by multiple physical components. With respect to procedures described in the embodiment, order can be rearranged, if no conflict occurs. Though the user equipment 100 and the base station 200 are described by using the functional block diagrams for the convenience of description, such devices may be embodied by hardware, software, or a combination of hardware and software. Each of the software executed by the processor included in the user equipment 100 in accordance with the embodiment of the present invention, and the software executed by the processor included in the base station 200 in accordance with the embodiment of the present invention may be stored in any appropriate storage medium, such as a random access memory (RAN), a flash memory, a read-only memory (ROM), an EPROM, an EEPROM, a register, a hard disk drive (HDD), a removable disk, a CD-ROM, a database, a server, or the like.

Further, notification of information is not necessarily made in accordance with an aspect or an embodiment described in the present specification, but may be performed using other methods. For example, notification of information may be performed using a physical layer signaling (such as DCI (Downlink Control Information) or UCI (Uplink Control Information)), an upper layer signaling (such as an RRC (Radio Resource Control) signaling, a MAC (Medium Access Control) signaling, or broadcast information (MIB (Master Information Block) or SIB (System Information Block))), other signaling, or a combination of these signaling. Also, an RRC signaling may be referred to as an RRC message, and may be a message such as an RRC Connection Setup message, or an RRC Connection Reconfiguration message.

An aspect or an embodiment described in the present specification may be applied to a system using an appropriate system such as LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), or Bluetooth (registered trademark), or applied to a next-generation system enhanced based on the above systems.

With respect to procedures, sequences, flowcharts, or the like, described in an aspect or an embodiment of the present specification, order can be changed if no conflict occurs. A method described in the present specification discloses various step elements in an exemplary order, and the order is not limited to the disclosed order.

A specific operation, which is described in the present specification to be performed at the base station 200, may be performed at an upper node of the base station 200. In a network having one or more network nodes including a base station 200, it is obvious that various operations performed for communication with a user equipment 100 may be performed at the base station 200 and/or a network node other than the base station 200 (such as, but not limited to, an MME or an S-GW). The above description explains a case in which one network node other than the base station 200 is present, but the network node may be a combination of multiple other network nodes (such as an MME and an S-GW).

Each aspect or embodiment of the present specification may be used alone, or may be combined for use. Alternatively, the above two ways of use may be switched during execution.

The user equipment 100 may be referred to as, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms, by a person skilled in the art.

The base station 200 may be referred to as, an NB (NodeB), an eNB (enhanced NodeB), a base station, or other appropriate terms, by a person skilled in the art.

Terms "determine (determining)" used in the present specification may include a wide variety of operations. "Determining" may mean that, for example, judging, calculating, computing, processing, deriving, investigating, looking up (such as searching a table, a database or other data structure), or ascertaining is performed. "Determining" may also mean that receiving (such as receiving information), transmitting (such as transmitting information), inputting, outputting, or accessing (such as accessing data in a memory) is performed. Further, "Determining" may also mean that resolving, selecting, choosing, establishing, or comparing is performed. That is, that a certain action/operation is regarded as "determined" may be included in a scope of "determining".

A phrase "based on" that is used in the present specification does not mean "based on only", unless otherwise stated. In other words, the phrase "based on" means both "based on only" and "based on at least".

In a case in which a term "include", "including", or modifications of the term is used in the present specification or in the claims, these terms are intended to be comprehensive, similar to a term "comprising". Further, a term "or" used in the present specification or in the claims is not intended to be an exclusive or.

In an entirety of the present disclosure, if an article, such as "a", "an", or "the" in English, is added to a noun by translation, the article means that the noun may include one in number, or more than one in number, unless otherwise stated.

Although the present invention has been described in detail in the above description, it is obvious for a person skilled in the art that the present invention is not limited to the embodiments described in the present specification. The present invention can be practiced as a modified embodiment or an altered embodiment without departing an aim and a scope of the present invention defined with the claims. Accordingly, the description of the present specification is for explaining examples, and does not intend to limit a scope of the present invention.

LIST OF REFERENCE SYMBOLS 100 user equipment
110 signal transmitter
120 signal receiver
130 configuration information management unit
140 measuring unit
200 base station
210 signal transmitter
220 signal receiver
230 scheduler
240 configuration information management unit
250 NW communication unit
1001 processor
1002 memory
1003 storage
1004 communication device
1005 input device
1006 output device

What is claimed is:

1. A terminal comprising:
  a receiver configured to receive configuration information for cross link interference measurement from a base station; and
  a controller configured to measure received power of a reference signal transmitted from another terminal using a resource designated by the configuration information,
  wherein the reference signal used for the cross link interference measurement is a Sounding Reference Signal (SRS), and
  wherein the cross link interference measurement is performed in victim cells.

2. A system comprising:
  a terminal comprising:
    a receiver configured to receive configuration information for cross link interference measurement from a base station; and
    a controller configured to measure received power of a reference signal transmitted from another terminal using a resource designated by the configuration information,
    wherein the reference signal used for the cross link interference measurement is a Sounding Reference Signal (SRS), and
    wherein the cross link interference measurement is performed in victim cells, and the base station comprising a transmitter configured to transmit the configuration information.

3. A measurement method executed by a terminal, comprising:
  receiving configuration information for cross link interference measurement from a base station; and
  measuring received power of a reference signal transmitted from another terminal using a resource designated by the configuration information,
  wherein the reference signal used for the cross link interference measurement is a Sounding Reference Signal (SRS), and
  wherein the cross link interference measurement is performed in victim cells.

* * * * *